SEPARABLE FASTENING ELEMENT

Filed Dec. 17, 1962 17 Sheets-Sheet 1

SEPARABLE FASTENING ELEMENT

SEPARABLE FASTENING ELEMENT

Oct. 11, 1966 J. BILLARANT 3,277,547

SEPARABLE FASTENING ELEMENT

Filed Dec. 17, 1962 17 Sheets-Sheet 11

United States Patent Office 3,277,547
Patented Oct. 11, 1966

3,277,547
SEPARABLE FASTENING ELEMENT

Jean Billarant, 2 Avenue Odette, Nogent-sur-Marne, France

Filed Dec. 17, 1962, Ser. No. 245,247
Claims priority, application Luxemburg, Dec. 19, 1961, 40,976
10 Claims. (Cl. 24—204)

My invention has primarily for its object a method for producing yielding strips provided with elongated hook or loop-shaped elements, which strips are intended in particular for the execution of closing or securing means operating instantaneously through the engagement of elastic hook-shaped elements on one strip with the loop-shaped elements on another strip, the opening or release being obtained also instantaneously under the action of a mere stress providing a separation between said strips so as to open the hook-shaped elements which return then into their original shape, under the action of their own elasticity.

My improved method for the execution of a yielding strip provided with loop-shaped elongated elements consists in providing a sheet of parallel threads and giving said sheet a corrugated shape in a longitudinal direction after which a surface of said sheet thus shaped is coated with a liquid or pasty material adapted to become rigid and to form elementary supports adhering to the corresponding peaks of the corrugations of the thread sheet while the other sections of the threads form loops on the other surface of the sheet of threads.

In a first embodiment, I resort to threads of a plastic material such as superpolyamides, for instance that sold under the registered trade name Nylon which threads are subjected, after formation of the loops, to a suitable treatment, say a heat treatment, so as to fix the shape of said loops.

As concerns the hook-shaped elements, I cut a section of the loops formed by the threads at a predetermined distance from their apices.

The method is applicable as a whole more particularly to the execution of hooking or securing means including a section provided with hook-shaped elements and a section provided with loop-shaped elements.

My invention has also for its object a machine for executing said method.

My improved machine includes a frame, a series of parallel shaping bars, a series of parallel counterbars, the sizes of said bars and counterbars and their spacings being such that the counterbars may be brought into the intervals between the bars, means for feeding a sheet of threads of thermoplastic material, chiefly superpolyamides such as those referred to for instance, between the two series of bars and counterbars, means for urging in succession the counterbars and the sections of the sheet of threads extending between them, between the shaping bars, means for laying on the continuous surface constituted by the alternating bars and counterbars, a sheet of yielding plastic material so that the apices of the loops of threads which are urged by the counterbars into the intervals separating the bars, may be embedded in said plastic sheet, means for urging the counterbars away from the bars and lastly means for separating the shaping bars from the sheet of plastic material carrying the threads.

In a preferred embodiment, the shaping bars are carried by a first endless chain constituted by two rows of elongated members or links pivotally secured in sequence, the bars having their ends carried in two links facing each other whereas in a similar manner, the counterbars are carried by a second endless chain of which the operative strand extends along a section of the chain of shaping bars, the two chains being driven synchronously.

In a preferred embodiment, intended more particularly for the execution of yielding strips provided with loop-shaped elements, that is, more accurately, elements constituted by closed loops, the shaping bars slide in the chain carrying them and there are provided means for drawing them towards one side of said chain after laying the sheet of yielding plastic material until the space extending between two cooperating links is released with a view to forming a passage for said sheet of yielding plastic material carrying the loops which are to remain in their final closed condition while further means are adapted to urge thenafter said bars back into their original position.

According to a further embodiment, intended more particularly for the execution of yielding strips provided with elements forming elastic hooks, the machine includes furthermore cutting means adapted to ensure the cutting of one of the sides of the loops of threads which are held in the yielding sheet of plastic material, at a predetermined distance from their apices, with a view to transforming said loops into hooks.

My invention covers lastly the novel articles of manufacture provided through the execution of said method or through the use of a machine such as that defined hereinabove, said novel articles of manufacture being constituted by yielding strips carrying elongated hook-shaped or loop-shaped elements.

My invention will be better understood from the reading of the following description, reference being made to the accompanying drawings illustrating by way of examples and by no means in a limiting sense, an embodiment of a machine according to my invention, which machine is adapted to produce yielding strips carrying hook-shaped elements and an embodiment of a machine for executing yielding strips carrying loop-shaped elements.

Figure 1:
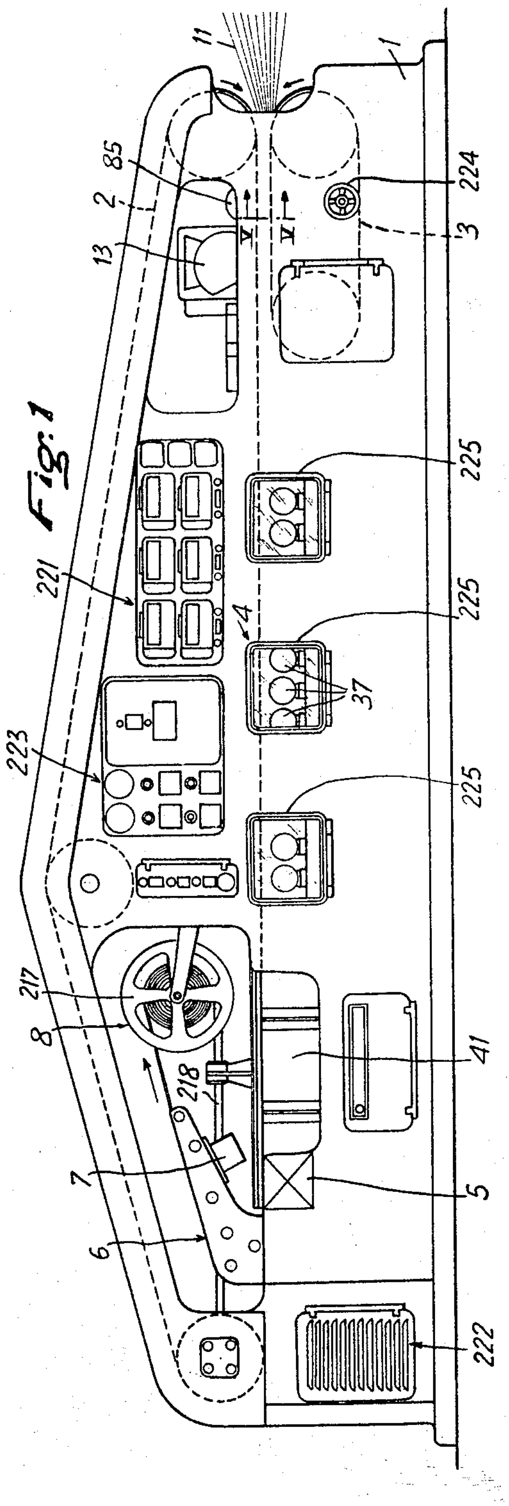
FIG. 1 is a front view of the machine.
Figure 2:
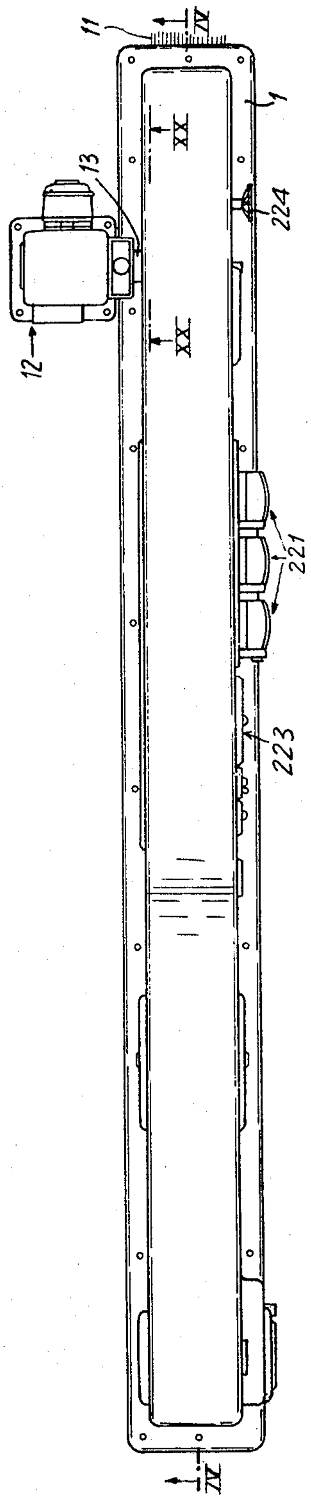
FIGS. 2 and 3 are respectively plan and side views corresponding to FIG. 1.
Figure 4:
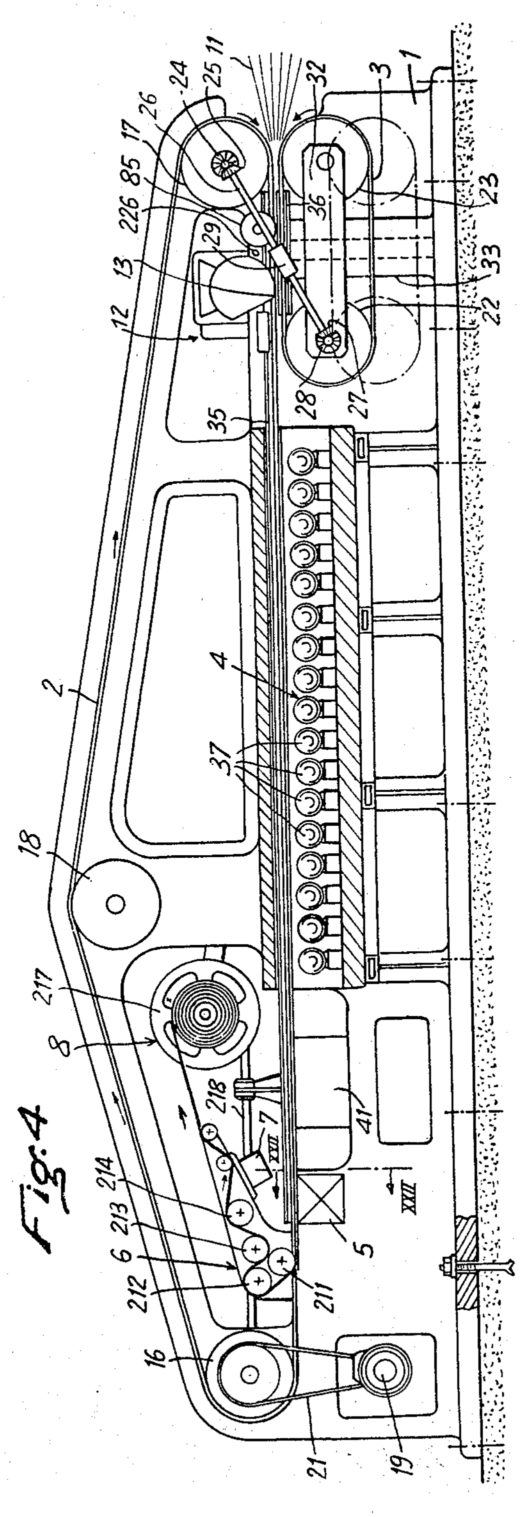
Figure 5:
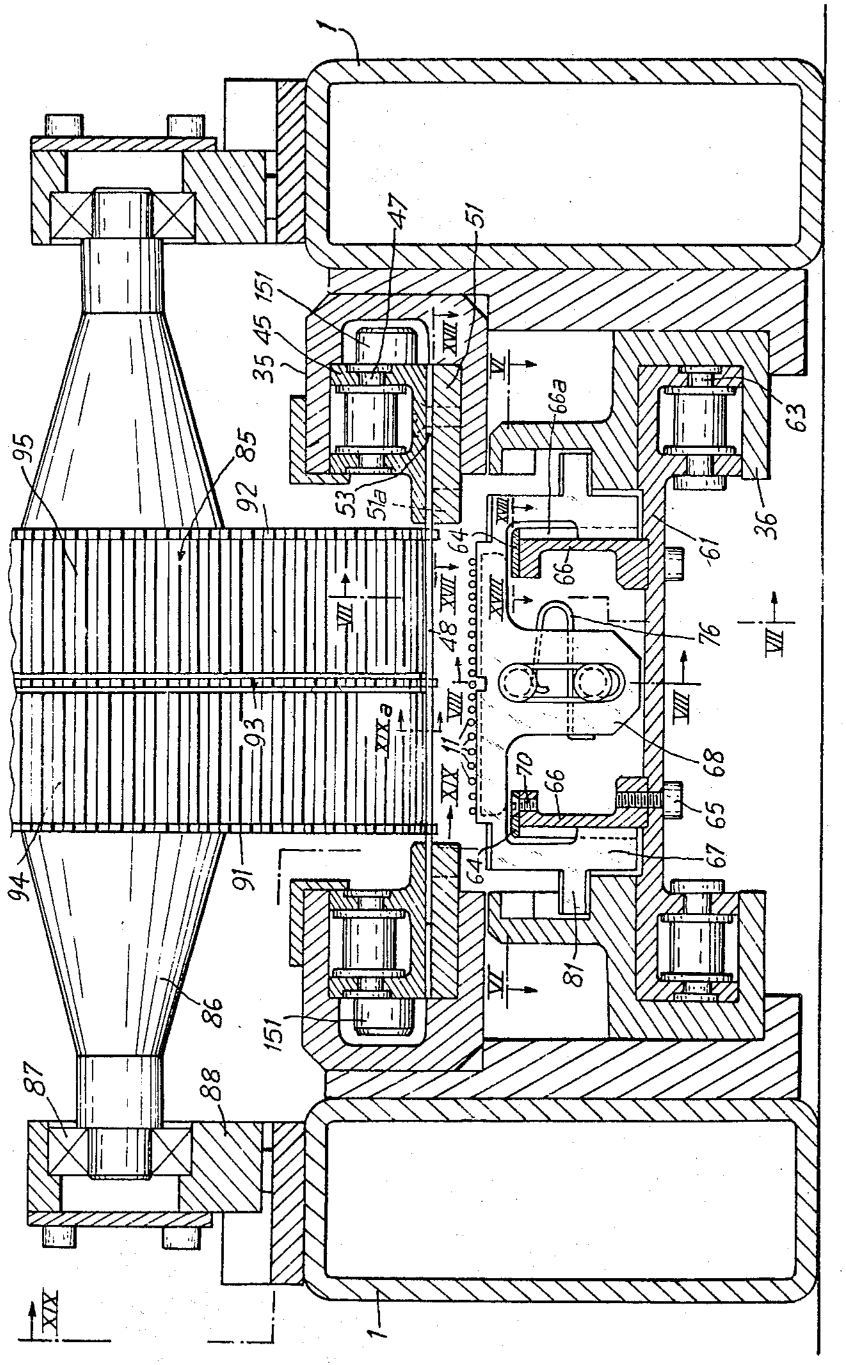
Figure 6:
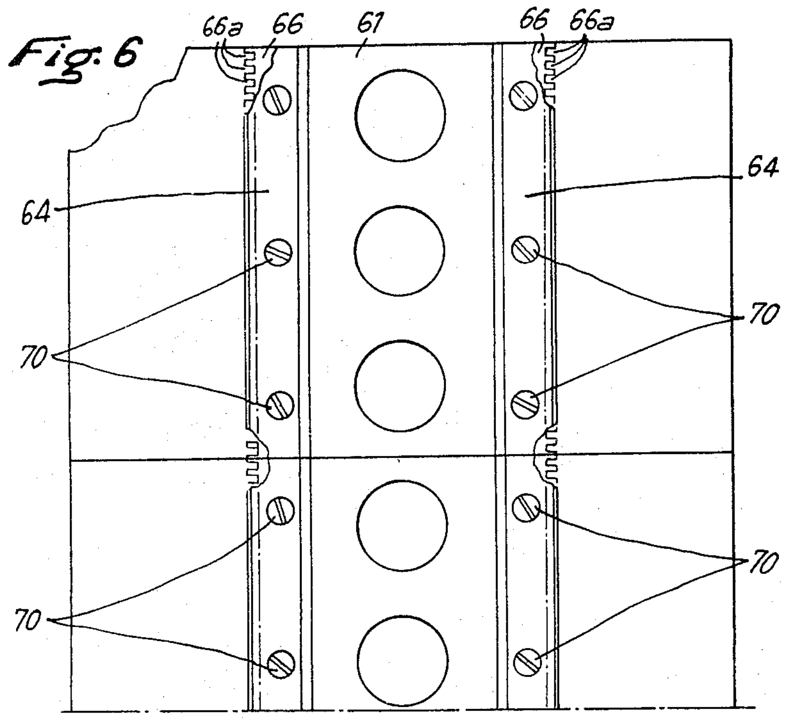
Figure 7:
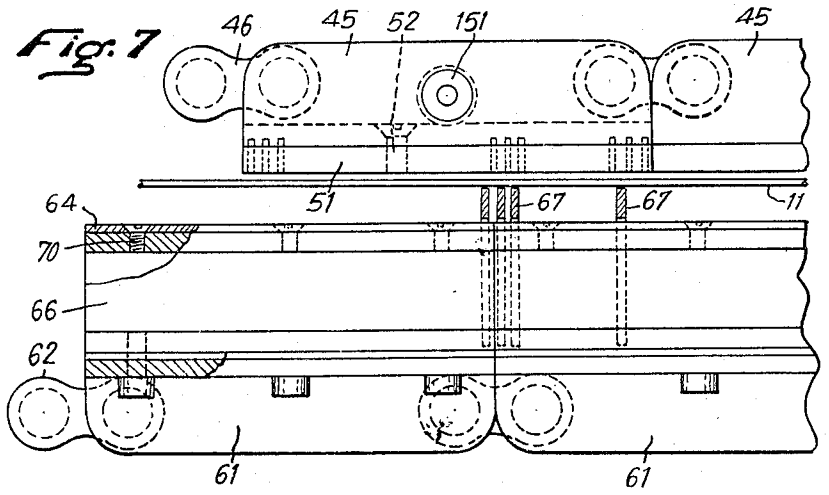
Figure 7A:
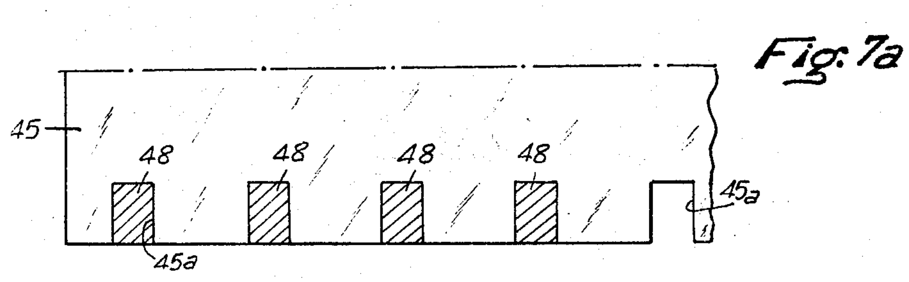
Figure 8:
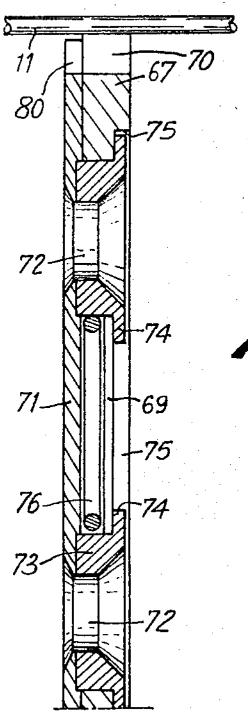
Figure 9:
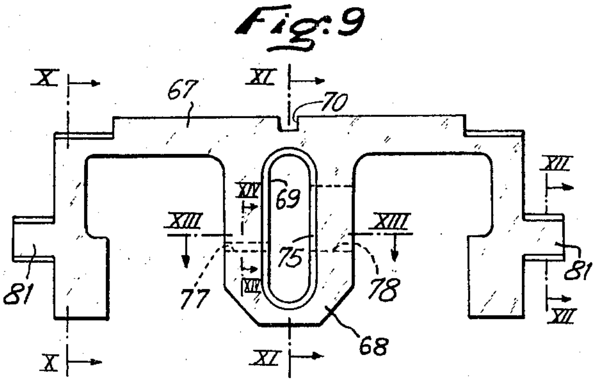
Figure 13:
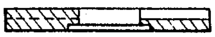
Figure 12:
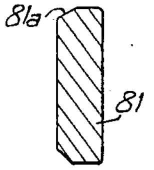
Figure 14:
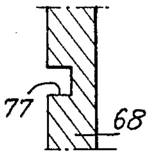
Figure 15:
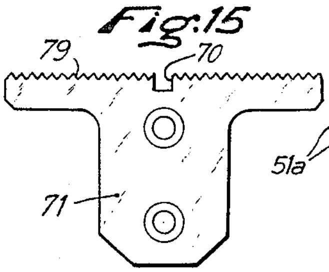
Figure 16:
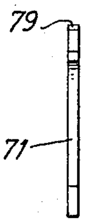
Figure 17:
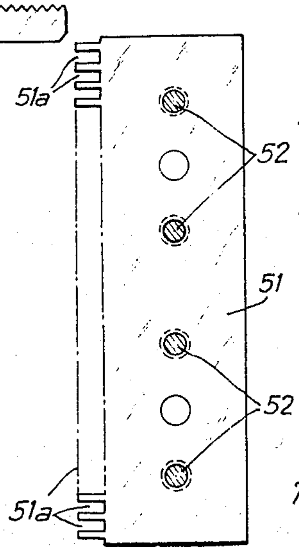
Figure 18:
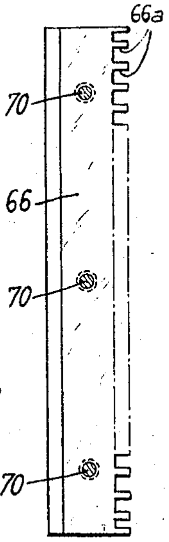
Figure 19A:
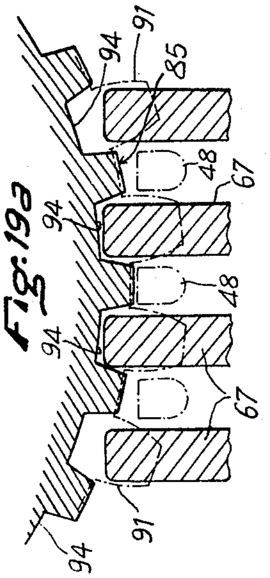
Figure 19:
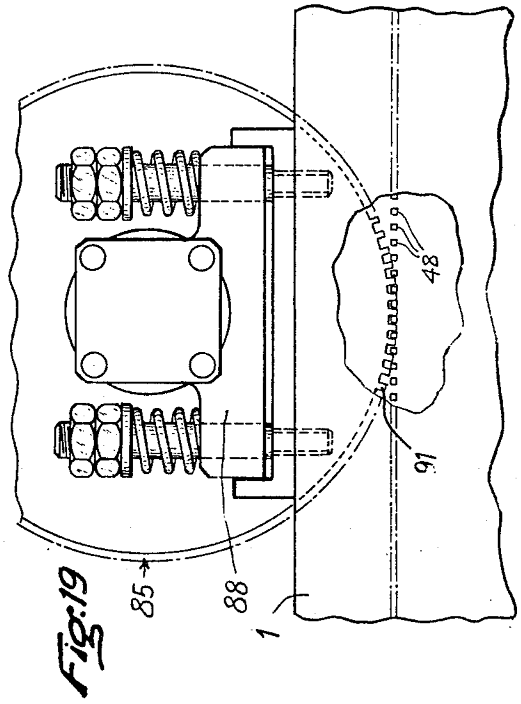

FIG. 4 is a vertical longitudinal sectional view passing substantially through line IV—IV of FIG. 2, FIG. 5 is on a larger scale, a cross-section through line V—V of FIG. 1, FIG. 6 is a horizontal cross-section through line VI—VI of FIG. 5, after removal of the counterbars, FIG. 7 is a vertical longitudinal cross-section through line VII—VII of FIG. 5, FIG. 7*a* shows on a larger scale a detail of FIG. 7, FIG. 8 is, on a still large scale, a cross-section through line VIII—VIII of FIG. 5, FIG. 9 is also, on a larger scale, an illustration of a single counterbar as it appears in FIG. 5, FIGS. 10, 11 and 12 are vertical cross-sections passing respectively through lines X—X, XI—XI and XII—XII of FIG. 9, FIG. 13 is a horizontal cross-section through line XIII—XIII of FIG. 9, FIG. 14 shows on a still larger scale, a detail of FIG. 9 along a sectional line XIV—XIV of said FIG. 9, FIG. 15 is a front view of a separate key in the position illustrated in FIG. 5 but on a larger scale, FIG. 16 is a side view corresponding to FIG. 15, FIGS. 17 and 18 are also, on a larger scale, horizontal cross-sections executed respectively through line XVII—XVII and XVIII—XVIII of FIG. 5, FIG. 19 is a sectional view through line XIX—XIX of FIG. 5, FIG. 20 is again, on a larger scale, a vertical longitudinal partial cross-section through line XX—XX of FIG. 2.

Figure 20:
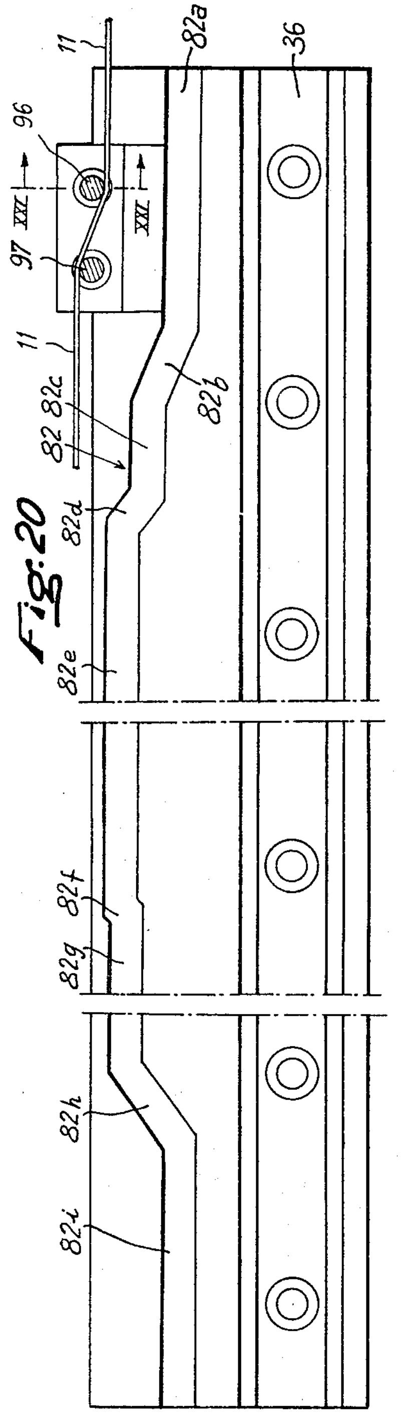
Figure 21:
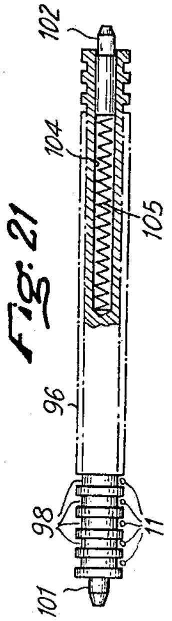

FIG. 21 is a partial cross-section through line XXI—XXI of FIG. 20.

Figure 22:
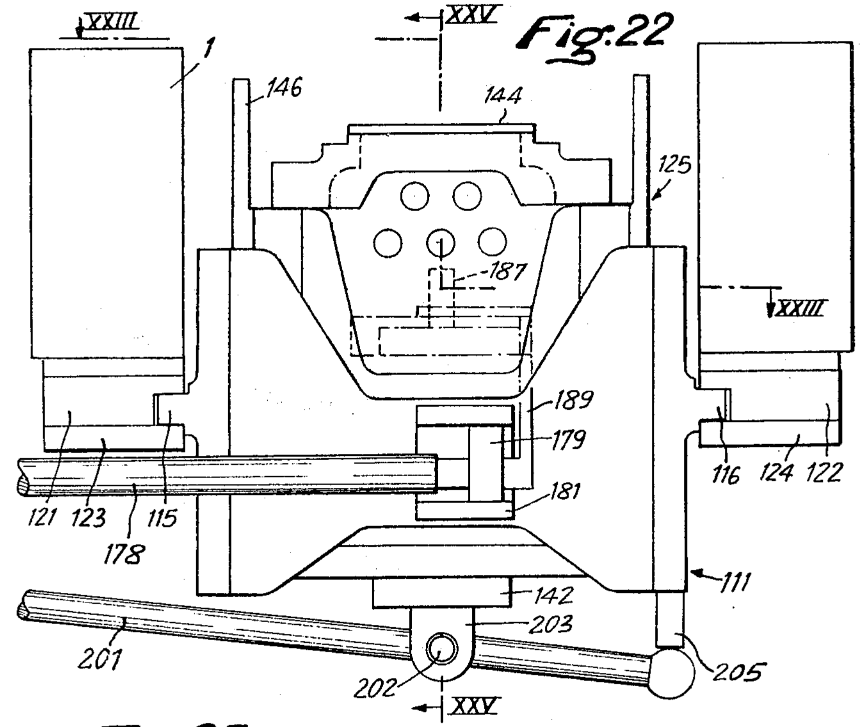

FIG. 22 is, on a larger scale, a transverse cross-section through line XXII—XXII of FIG. 4 showing the whole arrangement for cutting the thread loops with a view to producing hooks.

Figure 23:
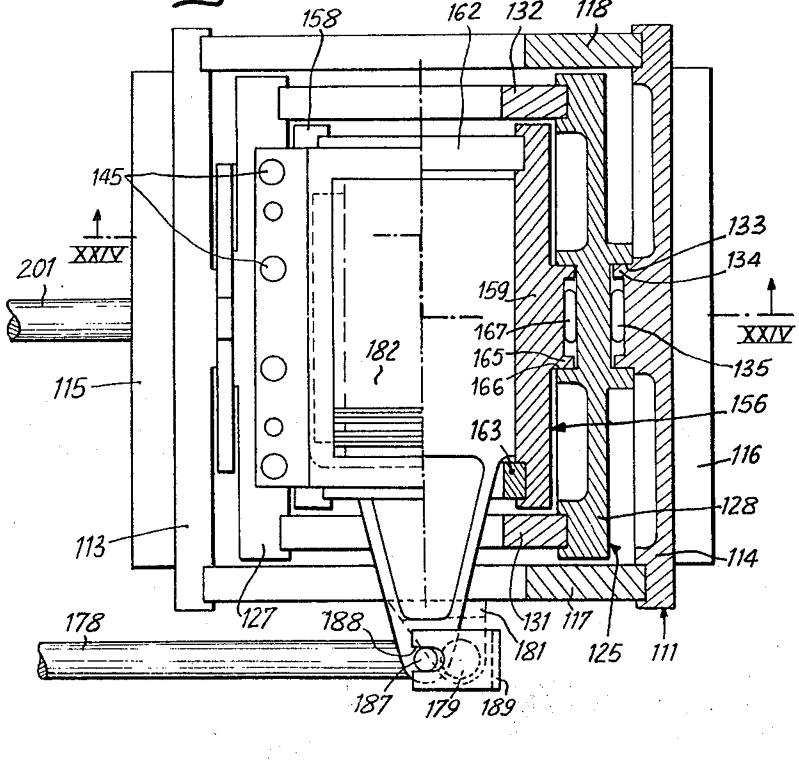

FIG. 23 is a cross-section through the broken line XXIII—XXIII of FIG. 22.

Figure 3:
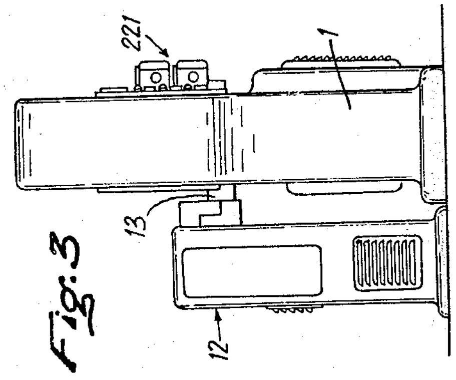
Figure 24:
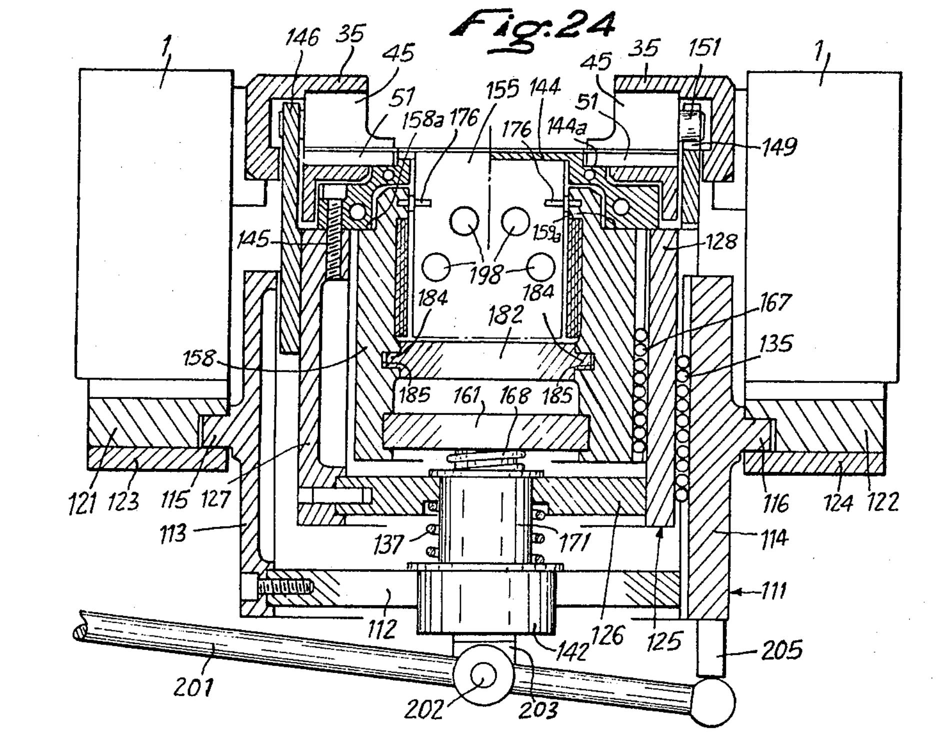

FIG. 24 is a cross-section through the broken line XXIV—XXIV of FIG. 3.

Figure 25:
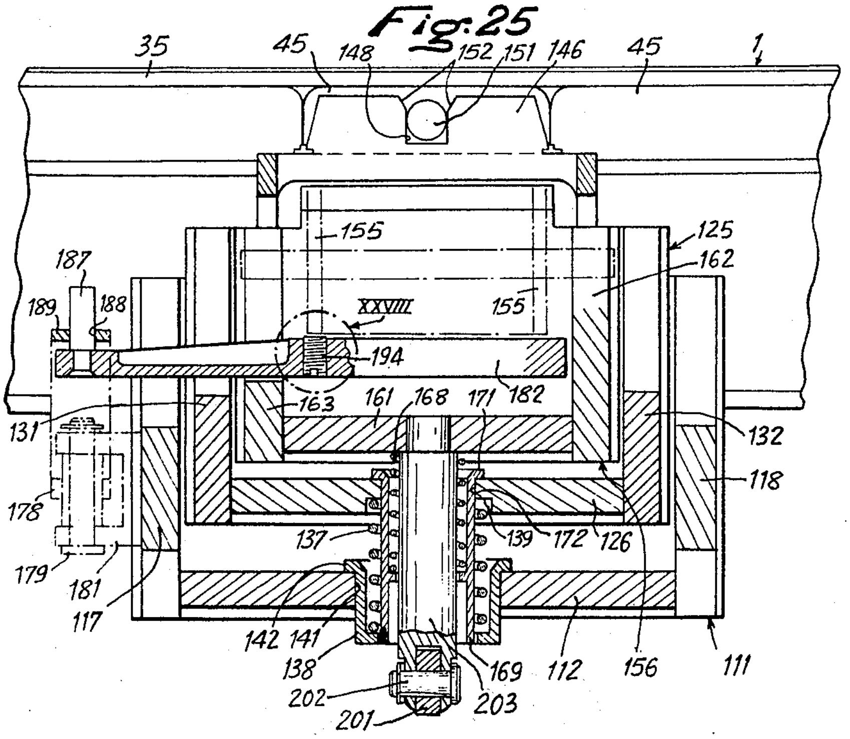

FIG. 25 is a vertical cross-section through line XXV—XXV of FIG. 22.

Figures 26, 27, 28:
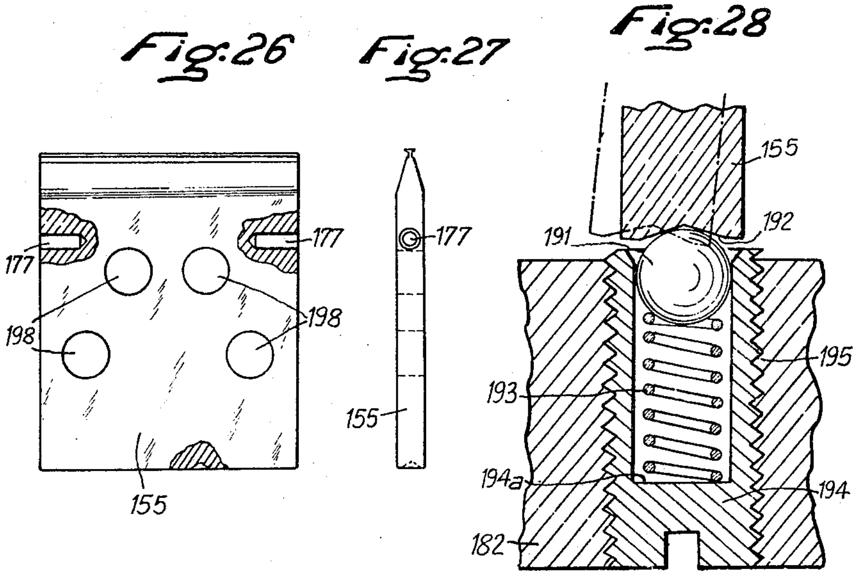

FIGS. 26 and 27 are respectively front and side views of a cutter shown alone.

FIG. 28 shows, on a larger scale, a detail of FIG. 25 defined by the circle XXVIII.

Figure 29:
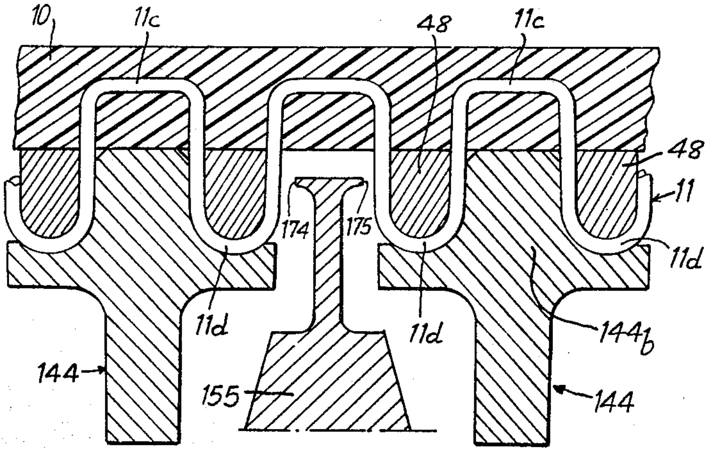

FIG. 29 shows, on a larger scale, the manner of operating of a cutter, shown in the same manner as in FIG. 25.

Figure 30:
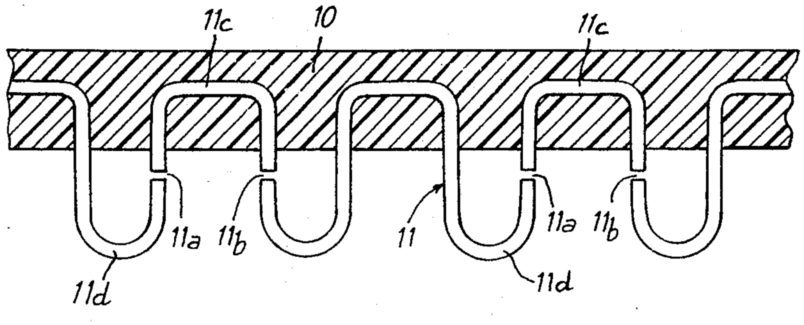

FIG. 30 shows, on a larger scale and cross-sectionally, a portion of a novel article of manufacture thus obtained.

Figure 31:
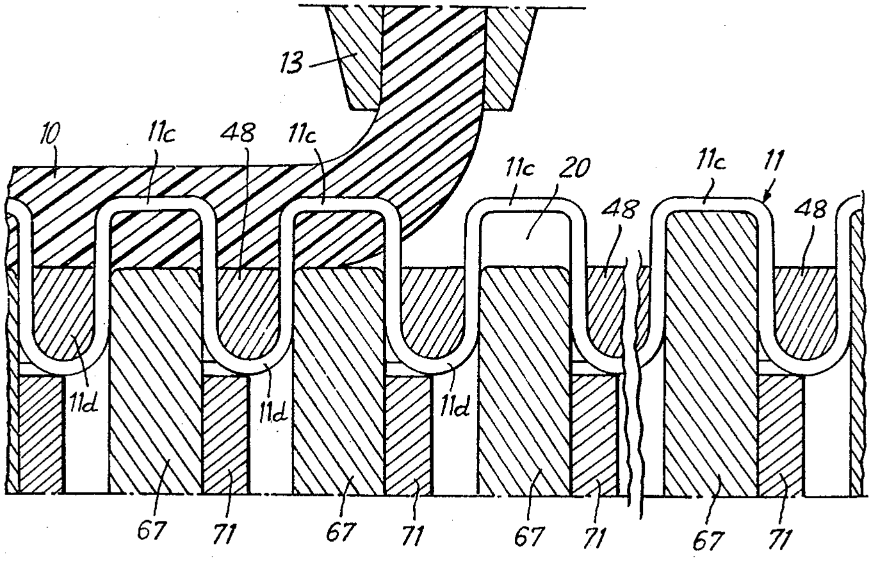

FIG. 31 shows also on a larger scale and cross-sectionally a portion of the novel aricle of manufacture obtained in its completely finished condition.

Figure 32:
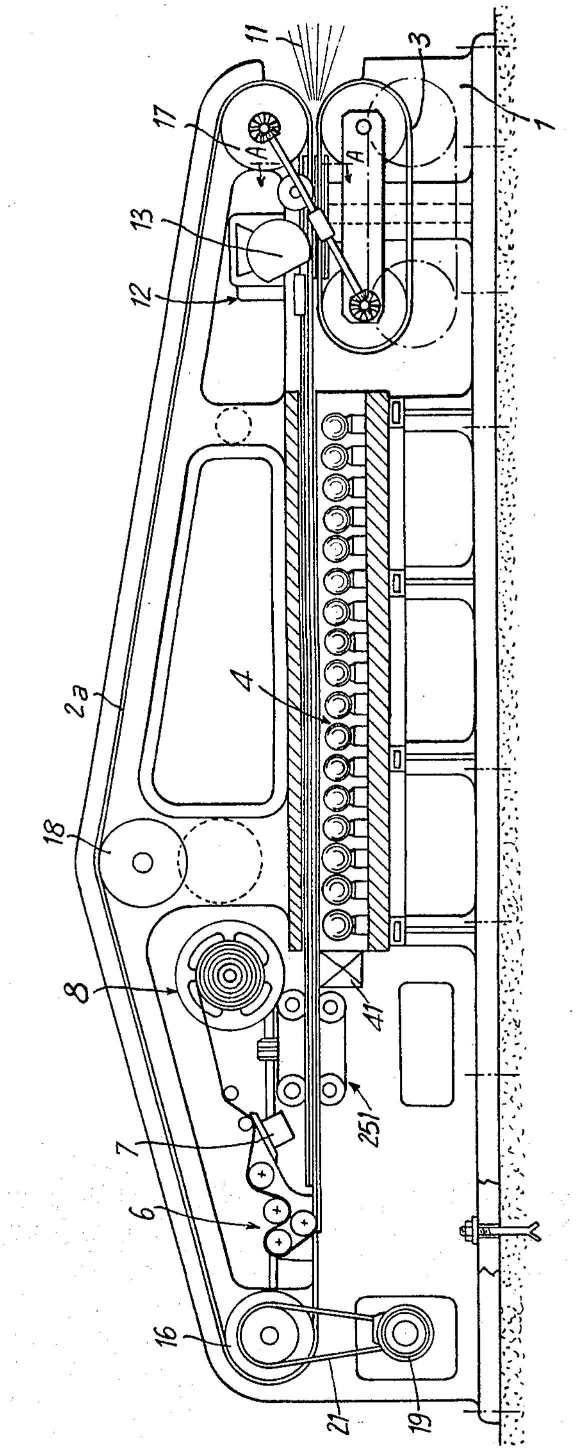

FIG. 32 is a longitudinal vertical cross-section of the machine.

Figure 33:
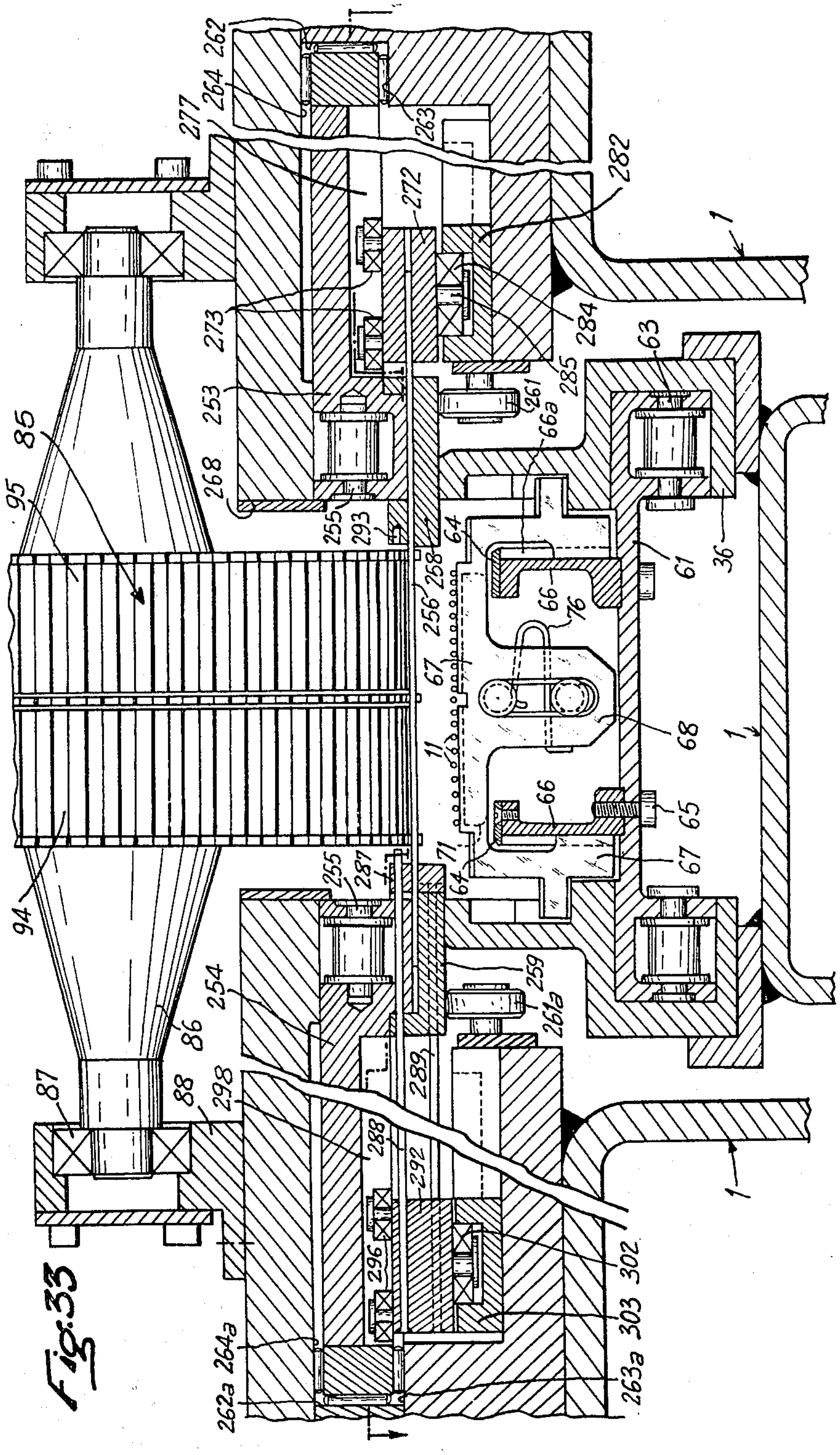

FIG. 33 is, on a larger scale, a partial cross-sectional view through line A—A of FIG. 32.

Figure 34:
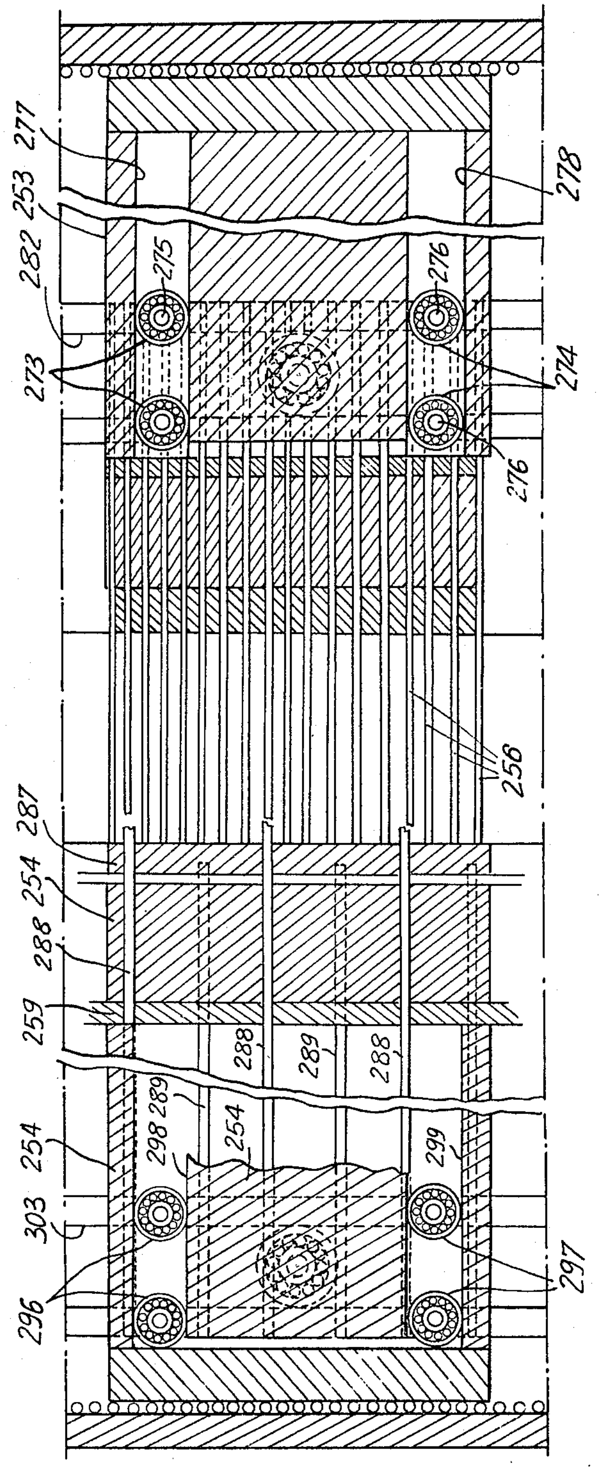

FIG. 34 is a horizontal cross-section executed substantially along the broken line B—B of FIG. 33.

Figure 35:
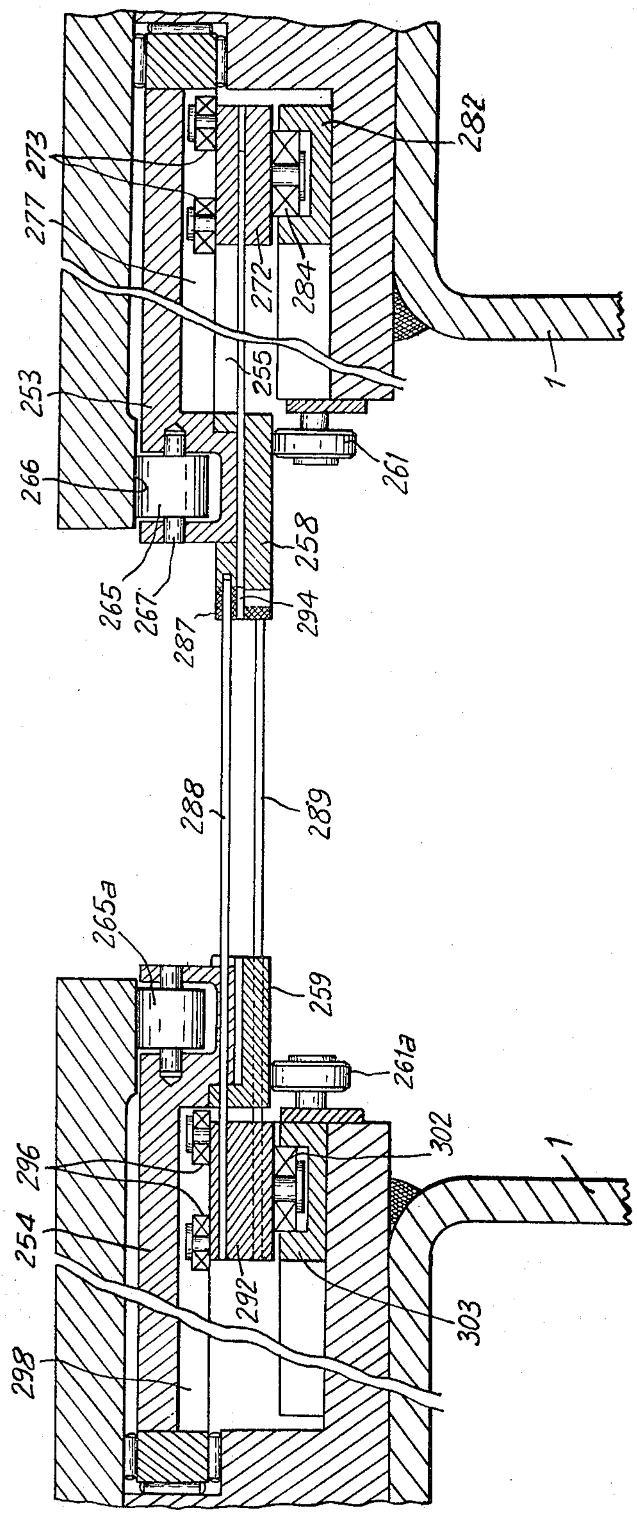

FIG. 35 illustrates the main section of FIG. 33 showing the parts in another position.

Figure 36:
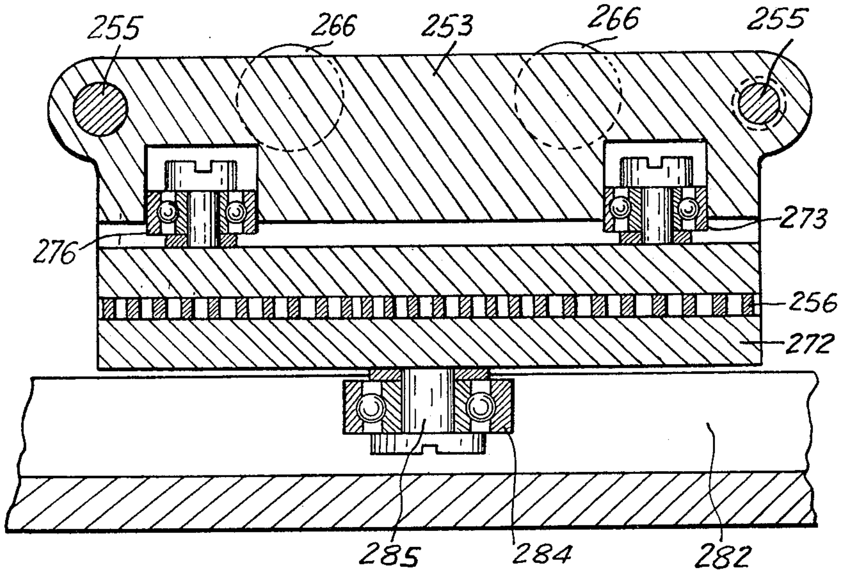

FIG. 36 shows, on a still larger scale, a cross-section through the broken line C—C of FIG. 35.

Figure 37:
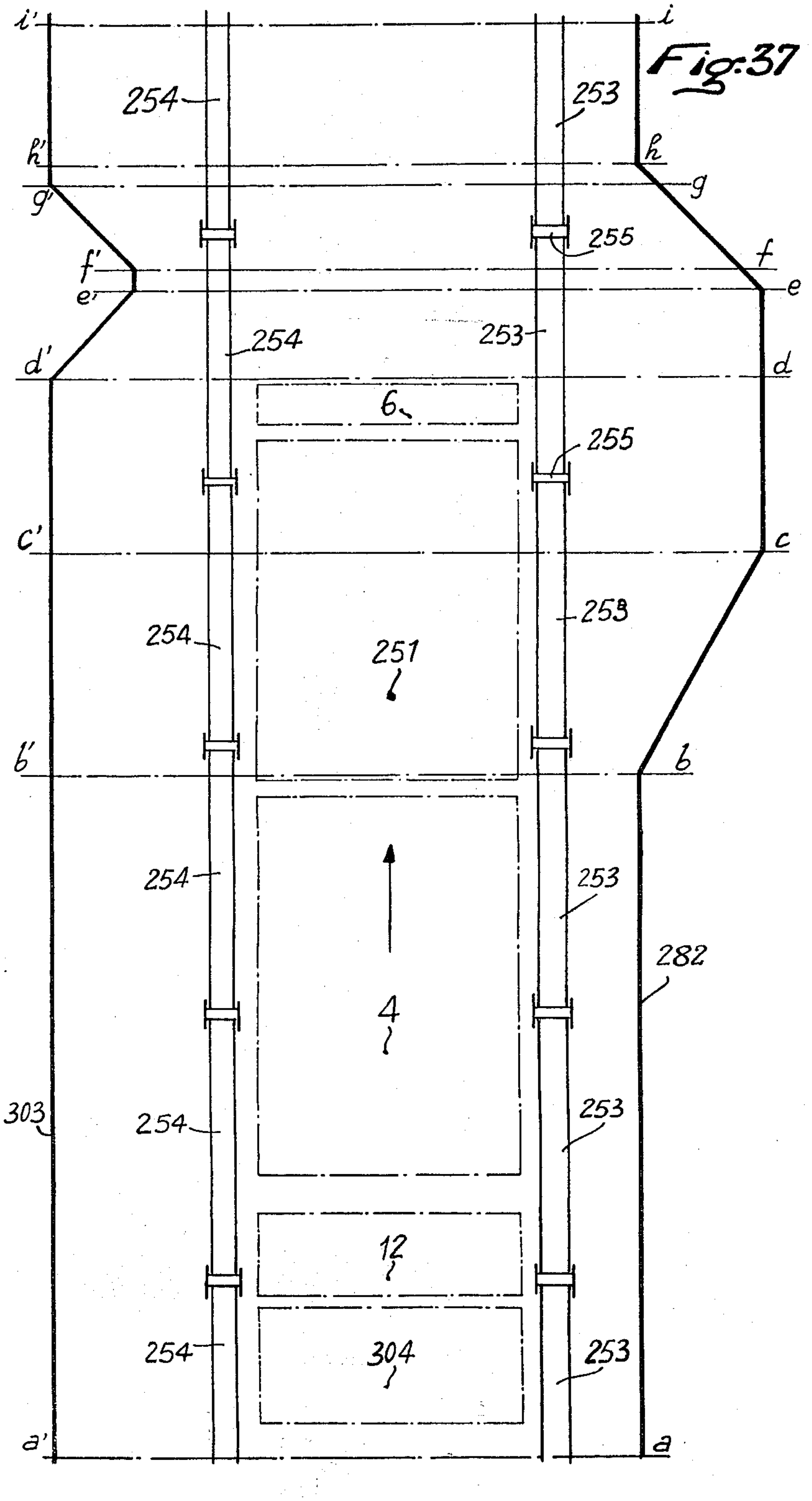

FIG. 37 shows diagrammatically the shape of the arrangement including the slideways controlling the bars and the guide of the bars.

Figure 38:
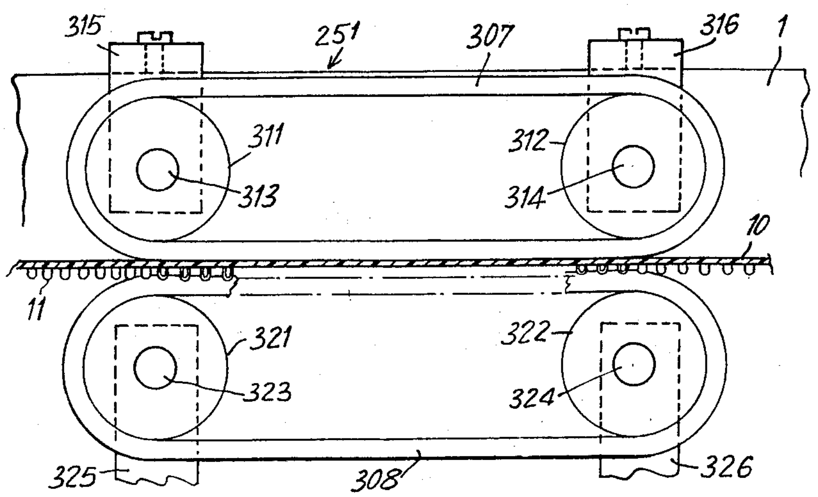

FIG. 38 is on a larger scale, an illustration of a detail of FIG. 32.

Figure 39:
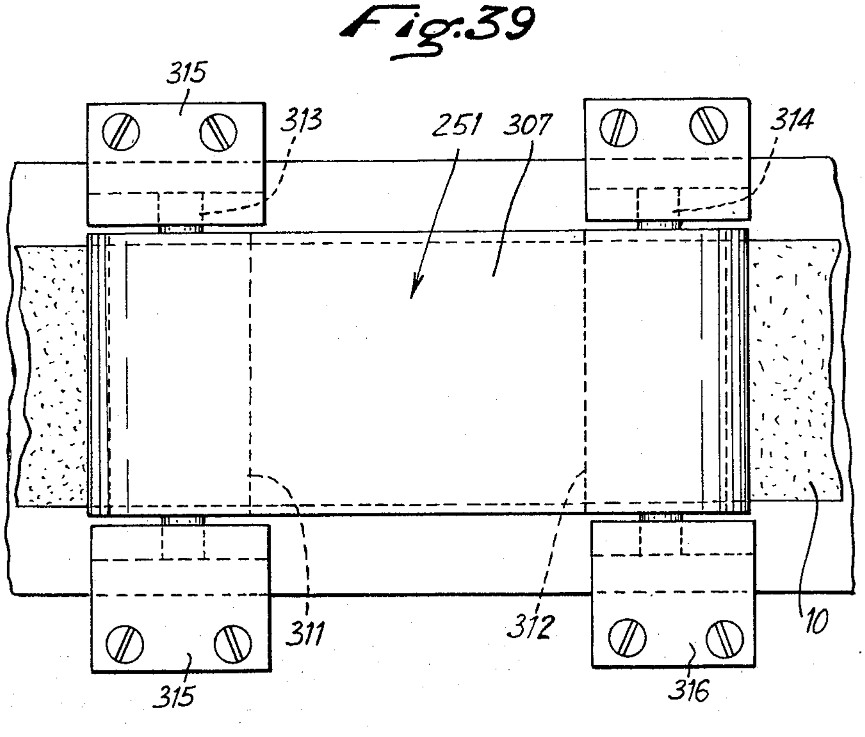

FIG. 39 is a plan view corresponding to FIG. 38, and

Figure 40:
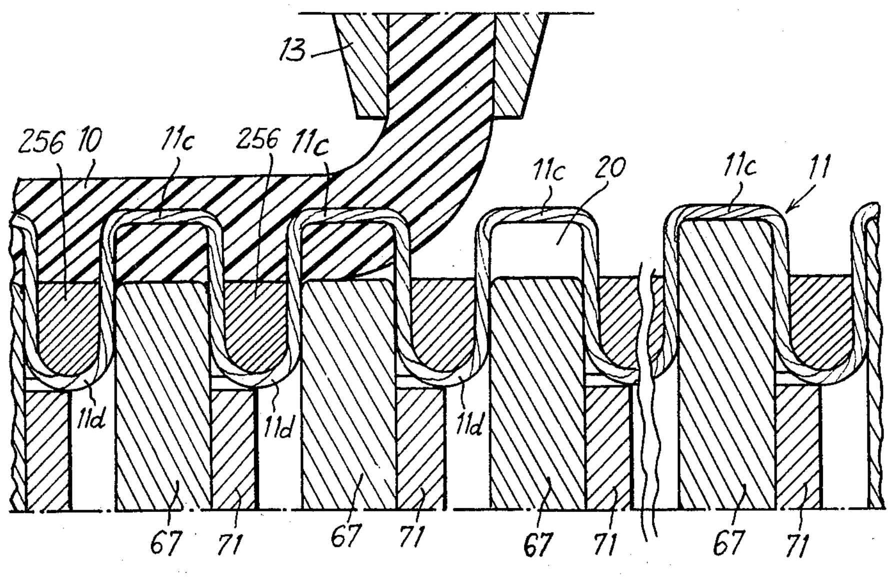

FIG. 40 shows, on a larger scale and cross-sectionally, a portion of the novel article of manufacture obtained, in its finished condition.

The machine illustrated in FIGS. 1 and 4 is entirely carried inside a frame generally designated by the reference number 1. The machine includes chiefly an upper chain 2 for the shaping bars, a lower chain 3 for the counter-bars, a furnace 4, a cooling system 41, an arrangement 5 for cutting the loops and forming the hooks thereby, means 6 for separating the finished product from the upper chain 2, means 7 for controlling the finished product and means 8 for storing the product on spools. A strip of plastic material 10 is laid over the threads 11 of a suitable thermoplastic material such as superpolyamides, for instance the material sold under the trade name Nylon, as provided by a suitable conventional extruding machine 12 located next to the frame 1 and of which the extruding head 13 (FIG. 3) is adjacent the upper surface of the lower strand of the chain 2 of shaping bars.

The sheet of threads 11 is fed by a suitable conventional creel which is not illustrated and is provided with individual adjustable tensioning means.

The upper chain 12 runs over two terminal drums 16 and 17 and over an upper guiding drum 18 provided with means which are not illustrated for adjusting the tensioning of said chain. The latter is driven by an electric motor provided with a speed reducer 19 through the agency of a chain or belt transmission 21.

The lower chain 3 passes over two drums 22 and 23 and is driven starting from the terminal drum 17 of the upper chain through a transmission including a bevel gear 24 rigid with the drum 17, a bevel pinion 25 secured to the end of an oblique coupling shaft 26 and engaging said bevel pinion 24, a further bevel pinion 27 rigid with the other end of said oblique shaft and a bevel pinion 28 rigid with the drum 22 and meshing with said bevel pinion 27. The diameters of the drums 17 and 22 and the gear ratios of the bevel gear pairs 24–25 and 27–28, are such that the two chains progress at the same linear speed. In order to make up for any possible shifting of the length of one chain with reference to the length of the other chain, the oblique shaft 26 is constituted by two sections which are interconnected by a frictional coupling sleeve 29.

The two drums 22 and 23 of the lower chain are carried by a horizintal support 32, the vertical position of which on the upright 33 is adjustable. It is also possible to release completely the lower chain with reference to the upper chain by lowering the support 32 into the position illustrated in dot and dash lines. To this end, the coupling sleeve 29 is provided preferably with two telescopically engaging parts which are not illustrated.

The lower strand of the upper chain 2 rests substantially throughout its length on guiding members 35 extending through the furnace or kiln 4 whereas the upper strand of the lower chain rests on other horizontal guiding member 36 which are much shorter than the guiding members 35.

The heating elements for the furnace or kiln 4 are constituted in the example illustrated by lamps 37. Glazed doors 38 allow inspecting and entering the inside of the kiln.

At the output of the kiln is located the abovementioned cooling system for the product, which system 41 is equipped with means for blowing air onto the product and which are not illustrated.

The upper chain is constituted by two rows of links 45 as illustrated in FIGS. 5 and 7, said rows being interconnected by further links 46, as provided by the pivots 47. Two links 45 facing each other are interconnected by bars 48, the ends of which are clamped between the inner surface of the corresponding link and a plate 51 (see FIG. 17) which is secured to the link 45 by screws 52.

Each bar 48 is constituted in the example illustrated by a small steel rod having a rectangular cross-section with a breadth of 0.8 mm. and a height of 1.2 mm. Each bar end is fitted in a transverse groove of a corresponding rectangular cross-section such as **45*a*** (FIG. 7*a*), formed in the lower surface of each link 45.

The longitudinal positioning of the steel bars in the groove **45*a* of a link 45 is ensured by a piano wire 53** housed in a groove of a corresponding cross-section formed in the lower surface of the link longitudinally of the latter. The end of each bar abuts thus substantially against the corresponding lateral surface of the piano wire.

In FIG. 5, are shown the horizontal guiding members 35 also shown in FIG. 4 and inside which slide to either side the systems formed by the links 45 and the cooperating plates 51. Said guiding members are two in number and each is provided with a cross-section in the shape of a laterally open U, the openings in the two U-shaped cross-sections facing each other.

The structure of the lower chain 3 is more intricate since it includes a succession of lower links 61 (FIGS. 5 to 7), which are also interconnected with one another through the links 64 as provided by the pivots 63.

In the upper surface of each link 61 are formed two horizontal longitudinal positioning grooves in which are secured through screws 65, two multiple guides 66 (see FIG. 18), the outer vertical flat surfaces of which extending in parallelism with the longitudinal direction of the link are provided with a series of vertical grooves **66*a*** (FIG. 18) throughout their length.

In each groove **66*a*, may slide the inner edge of one of the two legs of a member 67 forming a counterbar of a substantially portico shape (see also FIGS. 9 to 13). Two auxiliary plates 64 secured by screws 70 to the upper surface of the guiding members 66**, prevent said counterbars from being shifted upwardly and being disengaged with reference to said guiding members.

The upper horizontal section of each counter-bar carries a projection 68 facing downwardly and provided with a medial vertical slot 69 serving as a guide for a key 71 (see also FIGS. 15 and 16). To this end, there are secured to one surface of the key 71, two shouldered guiding studs 73 secured by means of two rivets 72 and of which the cylindrical shanks are housed in said vertical slot 69 formed in the counterbar, whereas their collars 74 engage a corresponding groove 75 cut along the periphery of said slot. The spacing between the axes of the two guiding studs is such that the key may slide vertically with reference to the counterbar, by a predetermined amount as will be disclosed hereinafter.

The key 71 is urged upwardly with reference to the counterbar by a piano wire 76 forming a hairpin shaped spring of which the free end engages the lower surface of the upper guiding stud 73 whereas its other end is fitted in a groove 77 (FIGS. 9 and 14) formed in the rear surface of the counterbar. The sections of the spring adjacent the key are housed in a broad cut 78 (FIGS. 9 and 11) formed in the rear surface of the counterbar.

The upper edge of the key 71 is provided with notches 79 the spacing of which is equal to the spacing of the threads and the depth of which is less than the diameter of said treads. Said notches are adapted to securely hold the threads in position.

The upper end of each counterbar 67 and of each key 71 is provided in its middle with a notch 70 and 80 respectively, the purpose of which will be disclosed hereinafter.

Each of the two depending arms of a counterbar 67 is provided with a lateral projection 81 directed outwardly and engaging a slideaway 82 (FIG. 20) rigid with the corresponding horizontal guiding member 36.

Considering the slideways 82 in the direction of progression of the operative strands of the two chains, said slideways 82 include in succession: a horizontal section **82*a* for which the upper edge of the counterbars 67 lies clearly underneath the shaping bars 48, a sloping upwardly directed section 82*b* the slope of which is about 20 to 30° in the example illustrated, a horizontal section 82*c* for which the upper edge of the counterbars 67 lies substantially at the level of the lower surface of the shaping bars 48, a second upwardly directed section 82*d* which, in the example illustrated, has a slope of 45°, a horizontal section 82*e* for which the upper edge of the counterbars 67 lies accurately at the same level as the upper surface of the shaping bars 48, the upper section of each counterbar being engaged between two bars, a downwardly directed section 82*f*, a horizontal section 82*g* located at a level very slightly underneath the level of the horizontal section 82*e*, say only one millimeter lower and then a downwardly directed section 82*b* and lastly a horizontal rest section located at the same level as the first section 82*a***.

The breadth of the counterbars 67 is equal to the breadth of the gap separating two successive bars, and consequently, when the counterbars are located in positions for which their lateral studs 81 are housed in the sections **82*e* of the slideways 82**, the upper edges of the bars and counterbars form a flat continuous surface.

The horizontal edges of the front surface (in the direction of progression of the counterbars), of the projections 81 of the counterbars are provided with bevels **81*a*, 81*b* (FIG. 12) which further their sliding along the slideways 82**.

Figure 10:
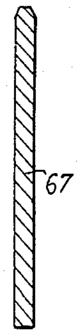
Figure 11:
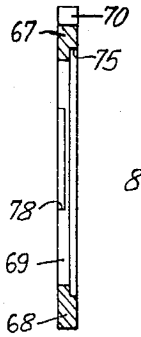

The ends of the upper edges of the counterbars are bevelled on both sides, as shown at **67*a* and 67*b* in FIG. 10, so that they may readily engage the notches 51*a* (FIGS. 5 and 17) of the plates 51, when the counterbars rise. Said notches 51*a* in the plates 51 are staggered with reference to the grooves 45*a* in the lower surface of the links 45 inside which are housed the ends of the shaping bars 48, since the counterbars are adapted to engage the gaps between the bars. When the counterbars have entered entirely the gaps between the bars, the notched edges 79 of the keys 71 engage the lower surfaces of the corresponding bars, under the action of the slightly deformed spring 76**.

Substantially in registry with the steep upwardly sloping section **82*d* (FIG. 20) of the slideways 82 controlling the rising and the sinking of the counterbars, is arranged a roller 85** FIGS. 4, 5 and 19) of a special structure, adapted to guide and to hold the bars having a very reduced cross-section during the introduction of the counterbars between said bars.

The roller 85 has a generally cylindrical shape and is provided with two shafts 86 revolving respectively into ball bearings 87 fitted in two bearings 88 rigid with the frame 1 of the machine. The diameter of the roller 85 and the level of the axis of its bearings are such that the cylindrical surface of said roller engages tangentially the upper surface of the shaping bars 48 with a view to cutting out any deforations of said bars in a vertical direction. The breadth of the roller is slightly less than the length of the uncovered section of the bars, that is than the spacing between the cooperating edges of the flanges of the upper links 45. The cylindrical section of the roller carries at each end, a series of teeth 91 or 92 engaging the gap between the bars in the vicinity of the ends of the latter which are rigidly fitted inside the links and it is also provided in its medial transverse plane, with a third series of teeth 93 adapted to hold each bar within an outline the projection of which on a horizontal plane, is accurately rectilinear in spite of the sag which may be given to it by the tensioning of the threads, and this is all the more true since the bars are very thin with reference to their length.

The notches 70 and 80 provided in the counterbars and in the keys, as referred to hereinabove, are intended to allow the passage of said central series of teeth 93 rigid with the roller 85. Furthermore, the spacing between the two extreme series of teeth of the roller is greater than the length of the counterbars. In the cylindrical surface of the roller, are cut grooves 94 along generating lines located between those extending through the three aligned series of teeth 91, 93 and 92 (FIG. 19*a*). Said grooves are adapted to provide a passage for the upper ends of the counterbars 67 when the latter rise above the upper surface of the bars 48, as will be disclosed hereinafter.

In registry with the first horizontal section **82*a* of the slideways controlling the rising and sinking of the counterbars, there are provided two combs 96 and 97 (FIG. 20) adapted to guide the threads 11 as they enter the machine. Each comb is constituted by a cylindrical roller such as 96 (FIG. 21), the diameter of which is small with reference to its length, and which is provided with annular grooves 98 adapted to be engaged by the threads 11 while two pivots 101, 102 rigid with said roller, revolve each, in a support such as 103 (FIG. 21) secured to the corresponding slideway 36. One of said pivots, 101, is rigid with the roller 96, while the other is slidingly carried in an axial bore 104 formed in said roller, said second pivot 102 being urged outwardly by a spring 105. The cutting means illustrated as a whole in FIGS. 22 to 25, are located at 5**, in FIG. 4.

Said cutting means include an outer frame 111 constituted by a bottom 112, two vertical walls forming double slideways 113, 114 and provided respectively with horizontal guiding tongues 115 and 116 and two other vertical staying walls 117 and 118. The two horizontal guiding tongues slide in two longitudinal guideways 121 and 122 rigid with flanges 123 and 124 and with the frame 1 of the machine.

In the frame 111, may slide vertically a casing 125 including a bottom 126, two vertical guiding walls 127, 128 and two other vertical staying walls 131, 132. Each guiding wall such as 128 is provided with a groove 133 inside which is fitted a tongue 134 forming part of the outer frame 111. A row of bearing needles 135 provides means for a very smooth vertical shifting of the casing inside the frame. I have not illustrated the row of bearing needles fitted between the wall 127 of the casing and the wall 113 of the outer frame 111.

The casing is urged upwardly by a coil spring 137 (FIGS. 24 and 25) of which the lower end rests in the annular bottom of a central socket 138 while its upper end engages the bottom of a notch 139 formed in the lower surface of the bottom 126 of the casing. The socket 138 housed in a bore 141 formed in the bottom 112 of the outer frame 111, bears in its turn, through a collar 142 at its upper end, against the upper edge of the bore 141.

The upper movement of the casing 125 is limited by the engagement of the shoulders 144*a* of the counterbars 144 with the lower surface of the plates 51 of the upper links 45. These counterbars 144 are secured to the casing 125 by screws 145 (FIG. 24). In FIG. 29 is shown on a larger scale, the shape of the upper operative section 144*b* of said counterbars 144, said upper section being in the shape of an inverted T of which the medial arm may be fitted between two shaping bars 48 while the lateral arms of the T clamp the threads 11 against the lower surface of said shaping bars.

The relative longitudinal accurate positioning of the counterbars, is performed by a positioning system including two plates 146 and 147 rigid respectively with the two walls 127, 128 of the casing and provided with a notch 148, 149 adapted to be engaged by the positioning studs such as 151, secured to the outer surfaces of the upper links 45. Bevel surfaces 152 at the entrance of the notch 148 further the accurate positioning of the cutting means with reference to the upper chain.

Cutting blades 155, the number of which is equal to fifteen in the example illustrated, are fitted in a support 156 constituted by two vertical plates 158, 159 which are interconnected by a horizontal plate 161 and two vertical staying plates 162, 163.

The support 156 for the cutting blades is fitted in its turn, in a manner such that it may slide vertically, inside the casing 125 inside which it is guided by a system of tongues 165 rigid with the support and engaging grooves 166 formed in the casing, on the opposite sides thereof (said system being illustrated only on one of said sides). A row of bearing needles such as 167, fitted on each side, provides a very smooth relative shifting of the support of the cutting blades inside the casing.

Said support 156 for the cutting blades is also urged upwardly by a central coil spring 168 engaging on the one hand, the lower surface of the plate 161 of the support of the cutting blades and on the other hand, an inner shoulder of a socket 169 bearing through a collar 171 at its upper edge against the upper edge of a bore 172 formed in the bottom 126 of the casing 125. The socket 169 serves as a matter of fact also as a core centering the spring 137 urging the casing upwardly. The travel of the support 156 for the cutting blades is limited upwardly, by the engagement of the shoulders 158*a*, 159*a* of its two opposite walls 158, 159 against the lower corresponding surfaces of the counterbars 144. At this moment, the operative end of each cutting blade enters the position illustrated in FIG. 29.

Each cutting blade 155 is constituted by a plate of a generally rectangular shape (FIGS. 26 and 27) which plate is arranged vertically in a direction transverse with reference to the general direction of the frame 1 (see also FIGS. 24 and 25) while its upper thinner end is provided with two transverse cutting edges 174 and 175 (see FIG. 27 and chiefly FIG. 29 which is drawn on a larger scale).

Each cutting blade is carried by two coaxial pivots 176 engaging respectively two openings 177 in its two vertical edges, said pivots being fitted in the upper sections of the two vertical walls of the support 156. The medial plane of each cutting blade lies, when inoperative, accurately at equal distances from the medial planes of the two successive counterbars 144 (FIG. 29).

In order to cut thirty rows of thread loops, the cutters slope slightly alternatingly to either side, as provided by a mechanism controlled by a lever 178 (FIGS. 22, 23 and 25) carried by a vertical spindle 179 fitted in a strap 181 rigid with the vertical wall 117 forming part of the outer frame 111.

The mechanism controlling the cutting blades includes a driving plate 182 (FIGS. 23, 24 and 25) provided with two tongues 184 (FIG. 24) sliding in two horizontal grooves 185 formed in the inner surfaces of the two vertical walls 158, 159 of the support for the cutting blades 156. The upper surface of the driving plate is located quite near the lower edge of the different cutting blades 155. The connection between the driving plate 182 and the control lever 178 is ensured by a stud 187 (FIGS. 23 and 25) rigid with the plate 182 and engaging a notch 188 formed in a strap 189 rigid with the spindle 169 to which the lever 178 is rigidly secured.

Furthermore, each cutting blade 155 is connected with the driving plate 182 by means of an elastic connection including a ball 191 (FIG. 28) housed in a conical recess 192 formed in the lower edge of the cutting blade 155 to be considered, a coil spring 193 of which one end engages the ball 191, and a socket 194 which is outwardly threaded and screwed into a tapped hole, corresponding thereto and formed at 195 in the driving plate 182, said socket being provided with a bottom 194*a* against which bears the other end of the spring 193.

Thus, when the lever 178 controlling the cutting means is caused to rock, this provides a sliding of the driving plate 182 in a corresponding direction and consequently all the cutting blades are caused to rock simultaneously round their pivots 176, until their cutting edges, having cut through the threads, have engaged the corresponding counterbars 144. By screwing each socket 194 adjustably inside the driving plate 182, it is possible to increase or to reduce the original tensioning of the coil spring 193 corresponding thereto, whereby it is possible to adjust, as required, the value of the torque applied to each cutting blade by a sliding movement of the driving plate.

The cutting blades are heated to a suitable temperature so as to produce a cutting of the threads under the best conditions through the agency of electrical resistances (which are not illustrated) and which are housed in the recesses 198 of formed in the cutting blades (FIGS. 24 and 26).

It is possible to lower the support 156 for the cutting blades together with the casing 125 containing it by means of a lever 201 (FIGS. 22 to 25) which is pivotally secured at 202 to the lower strap-shaped end of a central piston 203 of which the upper end is secured in the plate 161 of the support 156 carrying the cutters. An extension of the lever 201 engages a boss 205 secured underneath the outer frame 111.

When the lever 201 is lowered, this provides a sinking first of the cutter support 156 with reference to the casing 125 since the spring 168 is weaker than the spring 137 after which the casing 125 is caused to sink with reference to the outer frame 111 in antagonism with the spring 137, starting from the moment at which the bottom of the support 156 rests on the bottom of the casing 125.

Conversely, when the lever 201 is released, the system including the casing and the cutter-support rises first as a unit with reference to the outer frame under the action of spring 137 after which, when the counterbars 144 have engaged the bars 48 (FIG. 29), the casing no longer rises and the support 156 rises with reference to the casing under the action of its spring 168.

The arrangement illustrated at 6 (FIG. 4) for separating the finished product from the upper chain 2 includes merely rollers 211, 212, 213, 214 over which said product passes, while the chain continues its horizontal travel up to the terminal drum 16.

The arrangement 7 checking the finished product is not illustrated in detail and it includes means for stopping the machine whenever, for any reason whatever, the product does not provide the expected interengaging properties.

The arrangement 8 for storing on spools includes a spool 217 driven into rotation by the motor 19 through a suitable gear including a shaft 218 and means such as a friction coupling adapted to take into account the gradual increase in diameter of the winding formed on the spool.

The machine also includes obviously, a complete controlling and inspecting apparatus which is not illustrated in detail. I have merely shown in FIGS. 1 and 2, the control board 221 for the machine, the control chest 222 for the motor 19, the system 223 for adjusting the extruding means 12, the handwheel 224 for the vertical adjustment of the chain of counterbars 3, and the gates 225 through which the kiln may be inspected.

Lastly, I have shown at 226 (FIG. 4) an electric resistance for heating the threads so as to release any possible internal straining of said threads which straining might objectionably affect their subsequent shaping.

The operation of the machine is as follows, in the case of a continuous production for which it is assumed that the machine has already begun operation, after which I will disclose the manner of starting the machine.

The nylon threads 11 are stretched between the end of the strip already produced and the means adjusting the tensioning of the creel which is not illustrated.

The motor 19 rotates and drives the upper chain 2 of shaping bars (FIG. 4) together with the lower chain 3 of counterbars, through the agency of the gear including the oblique shaft 26.

The shaping bars move along the horizontal lower strand of the upper chain, throughout the length of the machine, in a same plane which is that of the guiding members 35, whereas the cooperating counterbars, driven in synchronism with the actual bars 48 in a horizontal direction, are subjected to a succession of vertical movements, during their passage along the different sections of the slideways 82 (FIG. 20). When the counterbars engage the section 82*a* (FIG. 20), the stretched threads 11 engage freely the gaps between the bars and the counterbars. When they have risen along the section 82*c*, their upper surface raises the sheet of threads substantially into the plane of the lower surfaces of the bars, but they do not engage as yet the gaps between the counterbars. As a matter of fact, each counterbar rises alone, in its turn, between two successive bars, and solely during the short time during which its lateral studs engage the steep upwardly directed slope 82*d* of the slideways 82. This movement causes said counterbars to depress the corresponding threads between two shaping bars so that said threads are given a looped shape 11*c* as shown in FIG. 31 until the upper surface of the counterbar lies slightly above (say by 1 millimeter) the plane formed by the upper surfaces of two successive bars 48. Said movement draws a length of each thread which is equal substantially to twice the depth of the loop, that is a comparatively considerable length. For this reason and taking into account the friction between the threads and the counterbars, only one counterbar is caused to rise at a time. The counterbars sink slightly (by about 1 millimeter in the example considered) as they pass along the downwardly sloping section 82*f* (FIG. 20) of the slideways, so that there is now a narrow gap 20 (FIG. 31) between the end of each loop 11*c* which has been thus raised and the upper surface of the corresponding counterbar 67. Into said space, may enter a sheet of plastic material 10, so that the roots 11*c* of the hooks to be formed subsequently are actually embedded and fitted in the carrier sheet or strip of plastic material.

While the counterbars engage the horizontal section 82*e* which is the highest in the slideways 82, the thread loops are submitted to the heat radiated by the resistance 226 (FIG. 4) so that any inner straining which the threads may suffer is removed, and said threads are thus subjected to a preliminary shaping of their upper section to be embedded subsequently in a polyamidic or the like sheet or strip.

As mentioned hereinabove, at the accurate moment at which the counterbars engage the gaps between the bars, the latter are held and guided by the teeth of the roller 85 and consequently in spite of the tensioning to which the comparatively numerous threads are subjected and of the reduced breadth of the shaping bars, said shaping bars remain rectilinear.

While the counterbars engage the further horizontal section 82*g* of the slideways, the extrusion head 13 lays, over the continuous surface constituted by the upper surfaces of the bars and counterbars, a layer or strip of plastic material forming a plate 10 covering completely the loops of threads 11*c* which have been raised by the counterbars (FIG. 31).

As the chains carrying the bars and counterbars progress simultaneously, further loops of threads are produced and covered by said strip of continuously laid plastic material, fed over the bars. The final product appears thus as a strip of plastic material inside which are anchored the upper sections of the different loops forming the upper surface of the undulating or corrugated sheet of threads.

Since the counterbars have been caused to sink by 1 mm., with reference to their maximum engagement between the bars, before the sheet or strip of plastic material has been laid over them, said sheet has entered the gap 20 (FIG. 31) extending between the upper end of each upper thread loop 11*c* and the upper surface of the corresponding counterbar 67. The threaded loops are consequently anchored rigidly in said sheet or plate of plastic material.

During the slight receding movement of the counterbars, the keys 71 remain engaged, under the action of their return spring 76 (FIGS. 5 and 8) through their upper notched edge, against the lower loops of threads 11*d* (FIG. 31) engaging the lower surface of the bars 48. This prevents the loops from being carried along downwardly by the counterbars during said receding movement and furthermore the notching of the keys maintains a uniform spacing of the threads, as obtained at the start by the combs.

The counterbars release readily the product through their downward movement when they pass along the downwardly sloping section 82*h* (FIG. 20) of the slideways 82 and reach the section 82*i* which lies at the same level as at 82*a* in their original position whereas the product formed on the chain of bars, continues its travel into the kiln 4 where the threads of thermoplastic material are fixed. The product is then cooled in the area 41 and reaches finally the cutting area 5.

In order to provide for the cutting of the lower loops of the threads, the lever 201 (FIGS. 22 to 25) is lowered so as to make the casing 125 sink together with the cutter support 156. The same lever provides a sliding movement of the outer frame 111, along its slideways 121, 122, rearwardly with reference to the direction of progression of the product, until the notches 149 of the casing lie underneath the positioning studs 151 on the next link carrying loops which have not yet been cut. The lever 201 is then allowed to rise into its original position under the action of the returning springs 137 and 168; the entire cutting system is then coupled with the chain of bars and accurately positioned with reference to the latter and consequently with reference to the loops to be cut, as already disclosed with full detail hereinabove, with reference in particular, to FIGS. 25 and 29. The lever 178 is then caused to rock alternatingly to either side so that, through the agency of the gear constituted by the driving plate 182, all the cutters are caused to pivot simultaneously first to one side, and then to the other so that each cutting edge 174 (FIG. 29) cuts, at raised temperature, the loop formed in each thread as shown at 11*a* (FIG. 30) whereas the opposite cutting edge 175 of each cutter cuts the adjacent loops at 11*b*. Each of said outer thread loops in the section of the product carried by the link with which the cutting means are coupled is thus cut and transformed into a hook.

As the product continues its progression, the cutting means are coupled in succession with each of the links and the simultaneous cutting of all the loops in a link is proceeded with again, as already disclosed.

The product obtained passes then over a roller 21 (FIG. 4), while the chain of bars 2 continues progressing horizontally along a rectilinear track until it reaches the drum 16, and the thread hooks open so as to be released with reference to the bars 48, and then return into their original shape under the action of their own elasticity.

The checking of the hooking capacities of the product is performed during the passage of said product through the means 7 in a manner such that, if the hooks are not properly formed or are absent, said means 7 produce a stoppage of the machine, so that it is possible to search for the possible failure.

The finished and checked product is wound on a spool 217 at the storing station 8.

It has been mentioned hereinabove that the description of the operation was given, assuming the machine had already started. For its starting, it is sufficient to bring the end of each thread on the downstream side of the extrusion head 13 and to hold it transiently in such a position while the front edge of the sheet of extruded plastic material is laid over the stretched sheet of threads thus obtained. As soon as the threads have been clamped between the bars and have formed one or more loops embedded in the sheet of plastic material, the automatic formation of the product continues automatically.

It should be remarked that if a thread is broken, this does not produce a stoppage of the machine, but simply the absence of one or more hooks, since the thread is held frictionally in contact with the bars or the thread guides, the slopes of the slideways 82 being furthermore selected in a manner such that when a thread breaks during its rising movement between two bars, it is engaged again by the next bar.

I will now describe a further embodiment of a similar machine, designed so as to produce strips of yielding material provided with looped thread-like elements, that is said elements are provided with closed loops instead of being provided with hooks. The machine illustrated as a whole in FIG. 32, is very similar to that illustrated in FIG. 3, so that it is not necessary to describe it again in detail. I will merely mention that the whole arrangement is carried inside a body 1 and that it includes chiefly an upper chain of shaping bars 2*a*, a lower chain of counter bars 3, a kiln 4, cooling means 41, an arrangement 6 adapted to separate the finished product from the upper chain of bars, means 7 for checking the finished product and means 8 for storing said product on spools. The strip or sheet of yielding plastic material is laid flat over a sheet of threads 11 constituted for instance by polyamidic threads including one or more strands, said plastic material being fed for instance by an extruding machine, of any suitable conventional type 12, located next to the body 1 and of which the extruding head 13 lies in juxtaposition with the upper surface of the lower strand of the chain of shaping bars 2*a*. The upper chain 2*a* formed by the shaping bars is specially designed so that the balls may be readily disengaged with reference to the loops carried by the finished product.

There are also incorporated with said machine, means 251 for holding the loops in position during the receding movement of the shaping bars, said means being described with full detail hereinafter. The machine does not include any loop-cutting means, of course, since the loops should remain closed and are not to be transformed into hooks.

The upper chain of bars 2*a* passes over the two terminal drums 16 and 17 and over the upper transmission drum 18 provided with means which are not illustrated for adjusting the tensioning of said chain. Said chain is driven by an electric motor through the agency of a speed reducing gear and of a chain or belt transmission 21.

The upper chain of bars 2*a* includes two rows of links 253, 254 (FIGS. 33 to 36) which are interconnected through the pivotal spindles 255.

The shaping bars 256 are constituted by steel rods of a rectangular cross-section the size of which is in the example considered 0.8 x 1.6 mm. Said shaping bars are adapted to slide in grooves of a corresponding rectangular cross-section provided in the lower surfaces of the links 253 and inside which they are held by plates 258, 259 which are secured to the sides of the corresponding links 253, 254, by means which are not illustrated.

The links such as 253, are guided during their longitudinal movements, by a system including rollers 261, the horizontal spindles carrying which are rigid with the body or frame 1, in association with a series of needles 262, extending in a vertical plane, a lower raceway 263 and an upper raceway 264, both rigid with the frame, and lastly further rollers 265 (FIG. 35) rolling over a raceway 266 also rigid with the frame, the spindles 267 carrying said rollers 265 being secured in said links transversely of the latter.

Flanges 268 prevent the links 253 from moving transversely towards the middle of the machine.

Similarly the links 254 are guided by corresponding members designated by the same reference numbers with the additional index *a*.

All the shaping bars 256, carried by a same link, are secured, through one of their ends, in a driving block 272 adapted to slide in the link 253 transversely of the latter, that is in parallelism with the direction of said bars. The guiding of each block 272 in the corresponding link, is ensured by two pairs of rollers 273, 274 (FIGS. 33 to 35) carried by the vertical spindles 275, 276 respectively carried by said block, said rollers engaging grooves of a corresponding rectangular cross-section 277, 278 formed in said corresponding link.

The control of the movement of the block 272 is ensured by a slideway 282 having a U-shaped cross-section and the shape of which is shown in FIG. 37, said slideway being rigid with the frame 1 and being engaged by a roller 284 carried by a vertical spindle 285 secured to the lower section of the block 272.

The shape of the slideway 282 is such that for the position illustrated in FIG. 33, the block 272 lies at one of the ends of its travel and the free end of each shaping bar 256 engages the opposite link 254, whereas at the other end of the travel of the block 272, (as illustrated in FIG. 35), the shaping bars 256 assume a completely collapsed position within the body of the link 253, so that they release completely the interval between the two links, that is the space in which the product constituted by the sheet of yielding elastic material in which the thread loops are anchored, is to be formed.

Since the shaping bars 256 are very long with reference to their cross-section, they may bend and be readily deformed, so that it would be a difficult matter to obtain reliably the engagement of their free ends in the corresponding grooves of the links 254, when they are urged back by their control block 272 secured to their opposite ends. In order to remove this drawback, there is provided a guiding system including a guiding plate 287 secured to the ends of the guiding rods 288 and 289 adapted to slide inside the plate 259 and the other ends of which are anchored in a control block 292. The guiding rods 288 and 289 are constituted, in said example, by cylindrical steel rods sliding in channels of a corresponding cross-section formed in the plate 259. In the case illustrated there are provided three rods 288 located in a first horizontal plane and two other rods 289 extending in a second horizontal plane which is lower than the first-mentioned horizontal plane.

The rods 288 project beyond the plates 287 by a predetermined amount so that they may engage corresponding openings 293 formed in the inner surface of the plate 258 rigid with the link 253. The ends of said rods, engaging the openings 293, ensure an accurate positioning of the guiding plate 287 with reference to the link 253 carrying the shaping bars 256.

The guiding plate 287 is provided with channels 294 registering with the shaping bars 256, so that the latter may engage said channels when the guiding plate 287 is urged towards the link.

The guiding plate 287 is adapted to engage alternatingly the inner surface of the plate 258 rigid with the link 253 carrying the shaping bars and against the inner surface of the plate 259 rigid with the opposite link 254. Said movements are ensured by similar movements of the block 292 in the link 254, which latter block is fitted in the same manner as the block 272 controlling the shaping bars and being provided, on the one hand, with two pairs of rollers 296, 297 engaging two transverse grooves 298, 299 formed in the link 254 and, on the other hand, with a roller 302 engaging a guideway 303 having a U-shaped cross-section and rigid with the frame 1 of the machine.

The slideway 282 controlling the sliding of the shaping bars 256 and the guideway 303 controlling the sliding of the guiding plate 287 extend practically throughout the length of the lower horizontal strand of the upper chain 2*a* carrying the bars. The shapes given to said guiding means 282 and 303 are associated in accordance with a predetermined relationship illustrated diagrammatically in FIG. 37 which may be considered to a certain extent, as a plan view corresponding to FIG. 33. In said FIG. 37, I have illustrated the chain of shaping bars as constituted by the two rows of links 253, 254, the two slideways or guideways considered being drawn as a simple line together with an area 304 illustrating the location where the counterbars engage the gaps between the bars for the formation of the loops, an area 12 illustrating the location of the head of the extruding machine, an area 4 defining the kiln and an area 251 corresponding to the location of the endless belts illustrated diagrammatically in FIG. 32.

While the bar-carrying chain progresses in the area 304 in which the loops are being formed, the area 12 corresponding to extrusion and the kiln 4, the shaping bars 256 should be positioned in the chain, in the manner illustrated in FIG. 33, whereas the guiding plates 287 should be urged against the links 254 carrying them. The slideway 282 controlling the shaping bars is provided therefore with a rectilinear section *ab* located comparatively near the axis of the machine whereas the guideway 303 controlling the guiding plate is provided with a corresponding rectilinear section *a'b'* which is also parallel with the chain, but is located at a comparatively large distance with reference to the axis of the latter.

When the bars are about to reach the area 251, where they should be released from the product obtained, they reach a section of the slideway 282 controlling them which is shown at *bc* and which slopes gradually away from the axis of the chain, whereas the guideway 303 controlling the guiding plates, is provided in registry therewith, with a corresponding rectilinear section *b'c'* aligned with the first-mentioned section *a'b'*.

When the bars reach the area 6 in which the product is to be removed off the chain, said bars should always be held in a released position and, to this end, the section of the slideway 282 extending between the points *c* and *d* is parallel with the axis of the chain and lies at a comparatively considerable distance therefrom. The corresponding section *c'd'* of the guideway 303 controlling the guiding plates is also in alignment with the preceding section *b'c'* since the guiding plate 287 should still be held against the link 254.

The guiding plate 287 should now engage the ends of the shaping bars 256 so as to guide them when their ends are about to enter the links 254. The section *d'e'* of the slideway 303 controlling the guiding plate slopes therefore gradually towards the axis of the chain, whereas the corresponding section *de* of the slideway 282 controlling the shaping bars lies in alignment with the section *cd* so that said bars may continue lying outside the chain.

The movement positioning the shaping bars 256 is now about to begin and to this end, the section *ef* of the slideway 282 moves gradually towards the axis of the machine whereas the corresponding section *e'f'* of the guideway 303 remains parallel with said axis. Said sections of the slideways correspond to the engagement of the ends of the shaping bars 256 inside the channels 294 formed in the guiding plate 287. Said engagement is performed very easily, since the guiding plate is held accurately with reference to the link 253, by the ends of the guiding and supporting rods 288 engaging the openings 293 in the plate 258 rigid with the link 253.

The bars continue then their movement positioning them in the chain and they are accompanied in said movement, by the guiding plate 287. To this end, the two guiding means controlling the bars and the guiding plate are provided with sloping sections, respectively shown at *fg* and *f'g'*.

The point *g'* of the slideway 303 controlling the guiding plate corresponds to the application of the latter against the inner surface of the plate 259 rigid with the link 254. The shaping bars continue their movement of engagement, under the control of the sloping section *gh* of the slideway 282 extending in alignment with the section *fg* whereby the ends of the shaping bars, which have already engaged the guiding plate, engage now the corresponding recesses in the link 254. Said engagement is performed without any difficulty since the guiding plate 287 is accurately positioned with reference to the link, by the rods 288 and 289 which guide and carry it.

During this movement, the guiding plate has obviously not moved since the guideway 303 is provided with a section *g'h'* extending in alignment with the section *c'd'*.

From this moment onwards, the shaping bars are again in their operative position and the guiding plate has receded. The guiding means are provided now with sections *hi* and *h'i'* facing each other and the locations of which are exactly the same as those of the points *a* and *a'* at the input of the machine, with reference to the axis of the machine.

The rollers 284 and 302, engaging respectively the two guiding means 282 and 303, leave the latter when they reach the points *i* and *i'* and they accompany the chain over the drum 6 at the end of the chain and then they continue along the upper section of the machine until they reach the input drum 17 and sink, with the upper strand of the chain so as to engage again the suitably flaring inputs of the two guiding means 202 and 303.

In FIG. 38, I have illustrated on a larger scale, the arrangement including endless belts designated as a whole by the reference number 251 in FIG. 32.

Said arrangement includes an upper endless belt 307 and a lower endless belt 308 lined with a material which is suitably yielding, such as rubber for instance.

The upper endless belt 307 passes over two drums 311 and 312 carried by two spindles 321, 322 carried in their turn by carrier members 315, 316 secured to the frame 1 of the machine.

Similarly, the endless belt 308 passes over two rollers 321, 322 carried by two spindles 323, 324 fitted in supports 325, 326, also secured to the frame of the machine.

The whole arrangement is fitted in a manner such that the lower strand of the upper belt 307 runs over the upper surface of the sheet 10 (FIG. 40) of plastic material whereas the upper strand of the lower belt 308 runs over the outwardly projecting apices 11*d* of the loops of threads engaged by the shaping bars 256.

Through this arrangement and while the shaping bars are being removed out of the finished product, there is no risk of seeing said bars carry along with them the loops of threads which would otherwise be wedged against said bars and damage the product.

In FIG. 33, I have also illustrated the chain of counterbars 67 and also the roller 85 for guiding and holding in position the bars. Said parts are the same as in the machine disclosed with reference to FIGS. 1 to 31 which machine is designed for the production of strips carrying hook-shaped elastic thread-like elements. In the machine illustrated in FIGS. 30 to 39, it is also possible not to provide with notches, the upper edge of the key 71 engaging each counterbar 67.

The operation of the machine illustrated in FIG. 32 to 39 is a follows.

Generally speaking, said machine operates in the same manner as the machine forming the product carrying hook-shaped elements, chiefly as concerns the input of the threads 11 in the machine, their formation as a sheet of parallel threads, the engagement of the counterbars 67 (FIG. 40) in the gaps separating the shaping bars 256 with a view to forming the loops and finally the laying of the sheet of plastic material 10 through the head 13 of the extruding means 12 and the passage of the product through the kiln 4.

The product appears thus in the manner illustrated on the left hand side of FIG. 40; in other words, it forms a series of closed loops 11*d* inside which are enclosed the shaping bars 256.

From this moment onwards, the particular features of the loop-forming machine become operative.

The chain of shaping bars reaches now the area 251 (FIG. 37) inside which the shaping bars are released under the action of the section *bc* of the slideway 282 controlling the sliding of said bars.

As already disclosed, the shaping bars disengage then the loops of the finished product through a sliding movement so that the product constituted by the sheet of plastic material 10 inside which are anchored the closed loops 11*d* may now disengage the chain of links 253 and 254 and continue its travel towards the storing means 8 (FIG. 33). During this time, the shaping bars return under the action of the section *efgh* of the slideway 282 into their operative position according to the procedure described in full detail hereinabove, in cooperation with the guiding plate 287 of which the movement is controlled by the guideway 303.

The operation of the lower chain formed by the counterbars is the same as in the embodiment constituted by the machine forming products carrying hook-shaped elements.

It is of interest to resort for the formation of a product provided with loop-shaped elements, to sheets of the same number of threads as the sheet serving for the formation of a product with hook-shaped elements so as to obtain two products having the same number of hooks and of loops, which allows the subsequent interengagement of the two articles under the most satisfactory conditions.

Obviously, my invention is not limited to the embodiment described and illustrated, and many modifications may be brought thereto without unduly widening thereby the scope of the invention, as defined in the accompanying claims.

Thus for instance, whereas I have described and illustrated means for cutting the loops open to form hooks by means of hand-actuated levers, it is possible to substitute for such levers, an entirely automatic control system for instance.

Furthermore, it is possible to associate, in the same machine, means for producing indifferently a yielding sheet carrying hook-shaped elements or loop-shaped elements, or else both hook-shaped and loop-shaped elements.

What I claim is:

1. A yielding strip of the character described comprising a base sheet constituted of a yielding plastic material, and solely of a plurality of generally parallel extending threads, having a longitudinally undulating shape said undulation having a first and second portion; successive ones of said first portions embedded in said base sheet to provide the sole means for fixedly securing said threads to said base sheet; and successive ones of said second portions extending out of said base sheet and forming a successive plurality of loops securably anchored to said base sheet; at least a number of said loops cut open at a short distance from their outer ends to produce hook-shaped elements.

2. A yielding strip as set forth in claim 1 wherein said threads are constituted of a superpolyamidic plastic material.

3. A separable fastening device, having first and second cooperating members, each of said members comprising a base sheet constituted of a yielding plastic material, and solely of a plurality of generally parallel extending threads, having a longitudinally undulating shape; said undulation having a first and second portion; successive ones of said first portions embedded in said base sheet to provide the sole means for fixedly securing said threads to said base sheet; and successive ones of said second portions extending out of said base sheet; said second portions forming a successive plurality of loops securably anchored to said base sheet; at least a number of the loops of said first member closed at their outer ends; at least a number of the loops of said second member cut open at a short distance from their outer ends to produce hook-shaped elements; said hook-shaped elements adapted to cooperatively engage said closed loops for fastening said first and second members together.

4. A separable fastening device as set forth in claim 3 wherein said threads are constituted of a superpolyamidic plastic material.

5. A separable fastening device as set forth in claim 3 wherein said hooking elements formed of loops corresponding to said closed loops.

6. A yielding strip of the character described, comprising a base sheet constituted of a solidified plastic material, and solely of a plurality of generally parallel extending threads, each of said threads having successive first portions embedded in said base sheet, with a substantial region thereof extending into said base sheet and firmly anchored thereto to provide the sole means for fixedly securing said thread to said base sheet, and successive second portions of said threads communicating with said first portions and freely projecting outward of said base sheet to provide connecting means for separably fastening said strip to a cooperating strip, said connecting means forming a successive plurality of loops securably anchored to said base sheet, at least a number of said loops cut open at a short distance from their outer ends to produce hook-shaped elements.

7. A yielding strip as set forth in claim 6, said substantial region includes a length of said thread extending generally transverse to said outward projecting direction, said transverse length communicating with the stem portions of adjacent hook-shaped elements.

8. A separable fastening device having first and second operating members, each of said members comprising a base sheet constituted of a solidified plastic material, and solely of a plurality of generally extending threads, each of said threads having successive first portions embedded in said base sheet, with a substantial region thereof extending into said base sheet and firmly anchored thereto to provide the sole means for fixedly securing said threads to said base sheet, and successive second portions of said threads communicating with said first portions and extending out of said base sheet as a successive plurality of loops, at least a number of the loops of said first member closed at their outer ends; at least a number of the loops of said second member cut open at a short distance from their outer ends to produce hook-shaped elements; said hook-shaped elements adapted to cooperatively engage said closed loops for fastening said first and second members together.

9. A separable fastening device as set forth in claim 8, the base sheet and threads of at least one of said operating members constituted of similar plastic materials.

10. A separable fastening device as set forth in claim 8, the base sheet and threads of at least one of said operating members constituted of superpolyamidic plastic materials.

References Cited by the Examiner

UNITED STATES PATENTS

| | | | |
|---|---|---|---|
| 635,284 | 10/1899 | Adair. | |
| 2,033,881 | 3/1936 | Curtis | 161—65 |
| 2,129,308 | 9/1938 | Randall | 161—54 |
| 2,308,336 | 1/1943 | Mason. | |
| 2,443,430 | 6/1948 | Nigro | 264—243 |
| 2,671,494 | 3/1954 | Coulliette | 156—435 |
| 2,717,437 | 9/1955 | De Mestral. | |
| 2,809,909 | 10/1957 | Chatanay | 161—54 |
| 2,866,206 | 12/1958 | Gebert | 161—67 X |
| 3,008,193 | 11/1961 | Been | 264—243 |
| 3,009,235 | 11/1961 | De Mestral | 24—205.13 X |
| 3,058,150 | 10/1962 | Makowski. | |
| 3,087,197 | 4/1963 | Fujii. | |
| 3,130,111 | 4/1964 | Izumi. | |
| 3,142,604 | 7/1964 | Mills | 156—435 |
| 3,147,528 | 9/1964 | Erb | 24—204 |
| 3,206,343 | 12/1965 | McFarlane | 156—78 X |

FOREIGN PATENTS

| | | |
|---|---|---|
| 1,260,293 | 3/1961 | France. |
| 576,092 | 4/1958 | Italy. |

BERNARD A. GELAK, *Primary Examiner.*

ALEXANDER H. BRODMERKEL, *Examiner.*

F. MARLOWE, *Assistant Examiner.*